(12) United States Patent
Sakazi et al.

(10) Patent No.: US 12,231,448 B2
(45) Date of Patent: Feb. 18, 2025

(54) USING GRAPH ENRICHMENT TO DETECT A POTENTIALLY MALICIOUS ACCESS ATTEMPT

(71) Applicant: Microsoft Technology Licensing, LLC, Redmond, WA (US)

(72) Inventors: Shay Chriba Sakazi, Beer Sheva (IL); Andrey Karpovsky, Kiryat Motzkin (IL); Amit Magen Medina, Netanya (IL); Tamer Salman, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 401 days.

(21) Appl. No.: 17/681,658

(22) Filed: Feb. 25, 2022

(65) Prior Publication Data

US 2023/0275913 A1    Aug. 31, 2023

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC ............. H04L 63/1425; H04L 63/1416; H04L 63/1408
See application file for complete search history.

(56) References Cited

U.S. PATENT DOCUMENTS

| | | | |
|---|---|---|---|
| 7,509,344 B1 * | 3/2009 | Kamvar | G06F 16/9566 |
| 7,941,857 B2 * | 5/2011 | Baum-Waidner | H04L 63/102 |
| | | | 726/25 |
| 8,813,234 B1 * | 8/2014 | Bowers | G06F 21/552 |
| | | | 726/25 |
| 8,813,236 B1 * | 8/2014 | Saha | H04L 63/1408 |
| | | | 726/25 |
| 8,881,288 B1 * | 11/2014 | Levy | G06F 21/577 |
| | | | 709/225 |
| 9,083,712 B2 * | 7/2015 | Porras | H04L 63/101 |
| 9,100,430 B1 * | 8/2015 | Seiver | H04L 63/101 |
| 9,183,387 B1 * | 11/2015 | Altman | H04L 63/1425 |
| 9,225,730 B1 * | 12/2015 | Brezinski | G06F 21/00 |

(Continued)

OTHER PUBLICATIONS

"International Search Report and Written Opinion Issued in PCT Application No. PCT/US23/011092", Mailed Date: Apr. 25, 2023, 16 Pages.

*Primary Examiner* — Aravind K Moorthy
(74) *Attorney, Agent, or Firm* — Wade IP Law PLLC

(57) ABSTRACT

Techniques are described herein that are capable of using graph enrichment to detect a potentially malicious access attempt. A graph that includes nodes and configuration-based links is generated. The nodes represent respective resources. Behavior-based links are added to the graph based at least in part on traffic logs associated with at least a subset of the resources. An attempt to create a new behavior-based link is identified. A probability of the new behavior-based link being created in the graph is determined. The probability is based at least in part on the configuration-based links and the behavior-based links. The new behavior-based link is identified as a potentially malicious link based at least in part on the probability being less than or equal to a threshold probability. A security action is performed based at least in part on the new behavior-based link being identified as a potentially malicious link.

20 Claims, 9 Drawing Sheets

(56) References Cited

U.S. PATENT DOCUMENTS

| | | | |
|---|---|---|---|
| 9,231,962 B1* | 1/2016 | Yen | H04L 63/1425 |
| 9,261,898 B1* | 2/2016 | Allen | G06F 1/12 |
| 9,356,941 B1* | 5/2016 | Kislyuk | H04L 63/14 |
| 9,516,053 B1* | 12/2016 | Muddu | G06F 16/9024 |
| 9,537,884 B1* | 1/2017 | Raugas | H04L 63/1433 |
| 9,710,646 B1* | 7/2017 | Zhang | G06F 21/56 |
| 9,787,640 B1* | 10/2017 | Xie | H04L 63/14 |
| 9,916,448 B1* | 3/2018 | Zhang | G06F 21/56 |
| 9,967,265 B1* | 5/2018 | Peer | H04L 63/1416 |
| 9,992,219 B1* | 6/2018 | Hamlet | H04L 63/1433 |
| 10,003,985 B1* | 6/2018 | Holland | H04W 24/06 |
| 10,121,000 B1* | 11/2018 | Rivlin | H04L 63/1408 |
| 10,129,276 B1* | 11/2018 | Raviv | H04L 63/1441 |
| 10,237,283 B2* | 3/2019 | Zhang | H04L 63/1416 |
| 10,291,645 B1* | 5/2019 | Frantzen | G06F 21/554 |
| 10,419,469 B1* | 9/2019 | Singh | G06F 16/9535 |
| 10,742,670 B1* | 8/2020 | Kayyoor | G06F 21/56 |
| 10,848,515 B1* | 11/2020 | Pokhrel | H04L 63/1433 |
| 10,958,667 B1* | 3/2021 | Maida | H04L 63/1425 |
| 11,032,303 B1* | 6/2021 | Efstathopoulos | G06F 16/285 |
| 11,055,317 B2* | 7/2021 | Dadkhahi | G06N 5/047 |
| 11,063,969 B1* | 7/2021 | Luo | H04L 63/0209 |
| 11,171,972 B1* | 11/2021 | Brody | H04L 63/1425 |
| 11,201,890 B1* | 12/2021 | Coull | G06F 16/9024 |
| 11,233,806 B2* | 1/2022 | Kondaveeti | H04L 63/1425 |
| 11,290,476 B1* | 3/2022 | Ochsner | H04L 43/106 |
| 11,310,342 B1* | 4/2022 | Frey | H04L 67/1012 |
| 11,367,323 B1* | 6/2022 | Shahidzadeh | G07C 9/37 |
| 11,399,039 B2* | 7/2022 | Rubin | G06F 21/554 |
| 11,457,031 B1* | 9/2022 | Bisht | G06N 7/01 |
| 11,531,780 B2* | 12/2022 | Kundu | G06N 3/04 |
| 11,671,436 B1* | 6/2023 | Xu | G06F 18/24 726/22 |
| 11,770,387 B1* | 9/2023 | Shivamoggi | H04L 63/1441 726/23 |
| 11,792,284 B1* | 10/2023 | Nanduri | G06F 9/542 709/224 |
| 11,936,558 B1* | 3/2024 | Qian | H04L 45/22 |
| 11,941,112 B2* | 3/2024 | Boutnaru | G06F 11/3006 |
| 11,946,766 B1* | 4/2024 | Volkerink | G01C 21/3673 |
| 12,118,077 B2* | 10/2024 | Manevitz | G06F 16/9027 |
| 2005/0262470 A1* | 11/2005 | Gavrilov | G06F 16/9024 707/E17.011 |
| 2006/0285543 A1* | 12/2006 | Bonsma | G06F 16/182 707/E17.108 |
| 2007/0041345 A1* | 2/2007 | Yarvis | H04L 45/24 370/331 |
| 2008/0044028 A1* | 2/2008 | Sun | H04L 9/0838 380/278 |
| 2008/0313117 A1* | 12/2008 | Galvin | G06F 16/951 706/45 |
| 2009/0157902 A1* | 6/2009 | Saffre | H04L 67/1082 709/242 |
| 2010/0192195 A1* | 7/2010 | Dunagan | G06F 21/577 726/1 |
| 2010/0246445 A1* | 9/2010 | Scarlatti | H04B 7/18508 370/255 |
| 2010/0268719 A1* | 10/2010 | Cormode | G06Q 30/02 707/E17.046 |
| 2011/0061104 A1* | 3/2011 | Sarraute Yamada | H04L 43/50 726/23 |
| 2011/0087924 A1* | 4/2011 | Kandula | G06F 11/0709 714/E11.029 |
| 2011/0213801 A1* | 9/2011 | He | G06F 16/9024 707/E17.017 |
| 2012/0051239 A1* | 3/2012 | Thai | H04K 3/94 370/252 |
| 2013/0114452 A1* | 5/2013 | Raoul | H04W 48/14 370/252 |
| 2013/0318616 A1* | 11/2013 | Christodorescu | G06F 21/552 726/25 |
| 2014/0075318 A1* | 3/2014 | Cheng | H04L 41/22 715/735 |
| 2014/0136838 A1* | 5/2014 | Mossbarger | H04L 63/0823 713/156 |
| 2014/0237570 A1* | 8/2014 | Shishkov | G06F 21/316 726/7 |
| 2015/0047026 A1* | 2/2015 | Neil | H04L 63/1433 726/22 |
| 2015/0067836 A1* | 3/2015 | Billa | G06F 21/567 726/22 |
| 2015/0188941 A1* | 7/2015 | Boshmaf | H04L 63/1441 726/22 |
| 2015/0244734 A1* | 8/2015 | Olson | G06F 21/577 726/25 |
| 2015/0350038 A1* | 12/2015 | Mohan | G06F 21/57 709/224 |
| 2015/0363702 A1* | 12/2015 | Baum | G06N 7/01 706/52 |
| 2016/0099953 A1* | 4/2016 | Hebert | H04L 63/1433 726/23 |
| 2016/0125094 A1* | 5/2016 | Li | G06F 16/9024 707/741 |
| 2016/0219066 A1* | 7/2016 | Vasseur | H04L 63/1458 |
| 2016/0277423 A1* | 9/2016 | Apostolescu | G06N 20/00 |
| 2016/0301709 A1* | 10/2016 | Hassanzadeh | H04L 63/1425 |
| 2017/0019251 A1* | 1/2017 | Jain | H04L 9/12 |
| 2017/0032274 A1* | 2/2017 | Yu | G06F 21/316 |
| 2017/0104774 A1* | 4/2017 | Vasseur | G06N 20/00 |
| 2017/0147815 A1* | 5/2017 | Pedersen | G06F 21/564 |
| 2017/0149814 A1* | 5/2017 | Chen | H04L 41/142 |
| 2017/0154445 A1* | 6/2017 | Maruhashi | G06F 21/00 |
| 2017/0279827 A1* | 9/2017 | Savalle | H04L 67/02 |
| 2017/0279829 A1* | 9/2017 | Vasseur | H04L 63/1458 |
| 2017/0279830 A1* | 9/2017 | Mermoud | A61M 15/009 |
| 2017/0279832 A1* | 9/2017 | Di Pietro | H04L 63/1458 |
| 2017/0279847 A1* | 9/2017 | Dasgupta | H04L 63/1425 |
| 2017/0316342 A1* | 11/2017 | Franc | G06N 20/10 |
| 2017/0318034 A1* | 11/2017 | Holland | G06N 20/10 |
| 2017/0346839 A1* | 11/2017 | Peppe | H04L 63/1433 |
| 2017/0364450 A1* | 12/2017 | Struttmann | H04L 9/3297 |
| 2017/0374575 A1* | 12/2017 | Kahtava | H04W 24/10 |
| 2018/0032724 A1* | 2/2018 | Tang | H04L 63/1416 |
| 2018/0048661 A1* | 2/2018 | Bird | H04L 63/1416 |
| 2018/0048662 A1* | 2/2018 | Jang | H04L 63/1425 |
| 2018/0083995 A1* | 3/2018 | Sheth | G06F 16/958 |
| 2018/0097833 A1* | 4/2018 | Saito | H04L 63/1433 |
| 2018/0159890 A1* | 6/2018 | Warnick | H04L 63/1433 |
| 2018/0167307 A1* | 6/2018 | Barry | H04L 45/7452 |
| 2018/0219888 A1* | 8/2018 | Apostolopoulos | G06F 21/554 |
| 2018/0241762 A1* | 8/2018 | Savalle | G06N 3/006 |
| 2018/0262327 A1* | 9/2018 | Jain | H04L 12/40013 |
| 2018/0262527 A1* | 9/2018 | Jain | H04L 9/088 |
| 2018/0343272 A1* | 11/2018 | Khalil | G06F 21/56 |
| 2018/0367548 A1* | 12/2018 | Stokes, III | H04L 63/1416 |
| 2018/0367557 A1* | 12/2018 | Brown | G06F 16/90335 |
| 2019/0050562 A1* | 2/2019 | Rhee | G06F 21/566 |
| 2019/0052663 A1* | 2/2019 | Lee | H04L 63/20 |
| 2019/0104121 A1* | 4/2019 | Khandani | H04L 9/0891 |
| 2019/0132344 A1* | 5/2019 | Lem | G06N 20/00 |
| 2019/0149572 A1* | 5/2019 | Gorodissky | G06F 21/55 726/25 |
| 2019/0182273 A1* | 6/2019 | Walsh | H04L 63/1425 |
| 2019/0230099 A1* | 7/2019 | Mestha | H04L 63/1425 |
| 2019/0253323 A1* | 8/2019 | Mohr | H04L 43/50 |
| 2019/0253442 A1* | 8/2019 | Brabec | G06N 20/00 |
| 2019/0260775 A1* | 8/2019 | Bartos | G06F 21/564 |
| 2019/0311136 A1* | 10/2019 | Pai | H04L 63/20 |
| 2019/0312898 A1* | 10/2019 | Verma | G06N 5/022 |
| 2019/0370813 A1* | 12/2019 | Bravick | G06Q 20/02 |
| 2019/0394225 A1* | 12/2019 | Vajipayajula | G06F 16/9024 |
| 2020/0007562 A1* | 1/2020 | Abouly | H04L 67/04 |
| 2020/0092316 A1* | 3/2020 | Tang | G06F 16/906 |
| 2020/0099704 A1* | 3/2020 | Lee | H04L 63/1416 |
| 2020/0099708 A1* | 3/2020 | Mathews | H04L 63/1425 |
| 2020/0120115 A1* | 4/2020 | Bird | H04L 63/1416 |
| 2020/0137083 A1* | 4/2020 | Chen | G06F 16/9024 |
| 2020/0145442 A1* | 5/2020 | Jang | H04L 63/1416 |
| 2020/0167785 A1* | 5/2020 | Kursun | H04L 43/045 |
| 2020/0167786 A1* | 5/2020 | Kursun | H04L 63/08 |
| 2020/0169483 A1* | 5/2020 | Kursun | G06Q 20/3678 |

(56) References Cited

U.S. PATENT DOCUMENTS

| | | | |
|---|---|---|---|
| 2020/0177466 A1* | 6/2020 | Rossi | G06N 5/01 |
| 2020/0177615 A1* | 6/2020 | Grabois | H04L 63/20 |
| 2020/0177617 A1* | 6/2020 | Hadar | G06F 16/9024 |
| 2020/0177618 A1* | 6/2020 | Hassanzadeh | G06F 21/552 |
| 2020/0195673 A1* | 6/2020 | Lee | H04L 45/70 |
| 2020/0220892 A1* | 7/2020 | Gibson | H04L 63/1441 |
| 2020/0233864 A1* | 7/2020 | Jin | G06F 16/288 |
| 2020/0244673 A1* | 7/2020 | Stockdale | H04L 41/14 |
| 2020/0280508 A1* | 9/2020 | Davey | H04L 45/03 |
| 2020/0301972 A1* | 9/2020 | Wang | G06N 20/10 |
| 2020/0304462 A1* | 9/2020 | Kopp | H04L 63/0227 |
| 2020/0320106 A1* | 10/2020 | Goldfarb | G06F 16/9024 |
| 2020/0351237 A1* | 11/2020 | Chakkirala | G06F 16/9024 |
| 2020/0387819 A1* | 12/2020 | Rogynskyy | H04L 51/212 |
| 2020/0412763 A1* | 12/2020 | Mercian | H04L 63/1408 |
| 2021/0012012 A1* | 1/2021 | Soroush | H04L 63/205 |
| 2021/0034737 A1* | 2/2021 | Khan | G06F 21/554 |
| 2021/0067558 A1* | 3/2021 | Ni | H04L 41/14 |
| 2021/0133331 A1* | 5/2021 | Lipkis | H04L 63/1483 |
| 2021/0144159 A1* | 5/2021 | Sanghvi | H04L 63/1425 |
| 2021/0158149 A1* | 5/2021 | Zhang | G06N 3/04 |
| 2021/0194907 A1* | 6/2021 | Bertiger | H04L 43/0811 |
| 2021/0194924 A1* | 6/2021 | Heinemeyer | G06N 5/04 |
| 2021/0217019 A1* | 7/2021 | Huang | G06Q 20/027 |
| 2021/0218770 A1* | 7/2021 | Ben-Yosef | G06F 21/554 |
| 2021/0243208 A1* | 8/2021 | Rubin | G06F 21/552 |
| 2021/0243212 A1* | 8/2021 | Bowman | G06N 5/022 |
| 2021/0248443 A1* | 8/2021 | Shu | G06F 16/9024 |
| 2021/0258334 A1* | 8/2021 | Sayag | H04L 63/1425 |
| 2021/0273953 A1* | 9/2021 | Fellows | G06F 21/554 |
| 2021/0279284 A1* | 9/2021 | Yu | G06F 16/9038 |
| 2021/0281396 A1* | 9/2021 | Yu | H04L 9/3247 |
| 2021/0281591 A1* | 9/2021 | Furtak | G06F 18/214 |
| 2021/0314341 A1* | 10/2021 | Moskovich | H04L 63/1416 |
| 2021/0350248 A1* | 11/2021 | Rogers | G06N 5/027 |
| 2021/0400059 A1* | 12/2021 | Hong | H04L 63/1416 |
| 2021/0406365 A1 | 12/2021 | Neil et al. | |
| 2022/0014534 A1* | 1/2022 | Basovskiy | H04L 63/1433 |
| 2022/0030010 A1* | 1/2022 | Shah | H04L 63/1425 |
| 2022/0070202 A1* | 3/2022 | Busany | H04L 63/1425 |
| 2022/0131894 A1* | 4/2022 | Hassanzadeh | H04L 63/1433 |
| 2022/0141235 A1* | 5/2022 | Muthuswamy | G06Q 30/0185 726/23 |
| 2022/0191230 A1* | 6/2022 | Morgan | H04L 63/20 |
| 2022/0197981 A1* | 6/2022 | Marson | G06F 21/14 |
| 2022/0198045 A1* | 6/2022 | Marson | G06F 21/6218 |
| 2022/0201014 A1* | 6/2022 | Saha | H04L 63/1425 |
| 2022/0224724 A1* | 7/2022 | Bazalgette | G06F 21/554 |
| 2022/0303291 A1* | 9/2022 | Baldini Das Neves | G06N 5/022 |
| 2022/0337619 A1* | 10/2022 | Ohta | H04L 63/1433 |
| 2022/0394049 A1* | 12/2022 | Abrahamian | G06F 40/134 |
| 2022/0407889 A1* | 12/2022 | Narigapalli | H04L 63/101 |
| 2022/0407891 A1* | 12/2022 | Albanese | H04L 63/205 |
| 2022/0414228 A1* | 12/2022 | Difonzo | G06F 16/24522 |
| 2022/0414664 A1* | 12/2022 | Liu | H04L 9/3247 |
| 2023/0007023 A1* | 1/2023 | Andrabi | H04L 63/1425 |
| 2023/0034910 A1* | 2/2023 | Engelberg | H04L 63/20 |
| 2023/0052827 A1* | 2/2023 | Araujo | G06F 9/5044 |
| 2023/0053044 A1* | 2/2023 | Wang | H04L 41/00 |
| 2023/0053182 A1* | 2/2023 | Bertiger | H04L 63/10 |
| 2023/0065398 A1* | 3/2023 | Purdy | H04L 63/1433 |
| 2023/0111177 A1* | 4/2023 | Noel | G06N 5/02 726/23 |
| 2023/0164059 A1* | 5/2023 | Dawani | H04L 45/22 370/392 |
| 2023/0177355 A1* | 6/2023 | Narayanam | G06N 5/01 706/46 |
| 2023/0269195 A1* | 8/2023 | Arumugam | G06N 20/00 709/226 |
| 2023/0275912 A1* | 8/2023 | Shahul Hameed | H04L 63/1425 726/23 |
| 2023/0308263 A1* | 9/2023 | Eldefrawy | H04L 12/4633 |
| 2023/0422039 A1* | 12/2023 | Saha | G06N 20/20 |
| 2024/0064014 A9* | 2/2024 | Maim | H04L 9/3218 |

\* cited by examiner

USING GRAPH ENRICHMENT TO DETECT A POTENTIALLY MALICIOUS ACCESS ATTEMPT

BACKGROUND

Malicious entities may seek to gain access to resources in a network-based system. Security of the network-based system typically depends on the ability of a security provider to detect such attempts by the malicious entities to gain access to the resources. By gaining access to a resource, a malicious entity may use the resource for malicious purposes. For instance, the malicious entity may gain unauthorized access to information via the resource and/or cause the resource to store or execute malicious code.

A variety of techniques has been proposed to detect malicious attempts to access resources. However, each such technique has its limitations. For example, security providers often use collaborative filtering for purposes of detecting malicious attempts to access resources. However, collaborative filtering techniques typically are characterized by a "cold start" issue in which no relationships between the resources are known at the time the collaborative filtering technique is initiated. In the collaborative filtering techniques, as interactions between the resources are detected, data regarding the interactions are stored in a matrix. This may lead to many cells in the matrix including no data because many of the resources may not interact with each other. Accordingly, analysis of the matrix may be relatively inefficient and consume a substantial amount of time and/or assets (e.g., processor, memory, network bandwidth) in an effort to detect a malicious attempt to access a resource. Moreover, performing a deep search on the matrix to identify a relationship among more than two resources may be relatively difficult.

In another example, a security provider may use a simple probability model to detect malicious attempts to access resources. However, the simplicity of this technique often leads to inaccurate and/or imprecise detections. For instance, the technique may provide a relatively high number of false positive detections of malicious access attempts and/or failures to detect legitimate malicious access attempts.

SUMMARY

Various approaches are described herein for, among other things, using graph enrichment to detect a potentially malicious access attempt. Graph enrichment includes generating a graph that includes nodes and configuration-based links and adding behavior-based links to the graph. A configuration-based link represents a hierarchical relationship between a first node and a second such that the first node belongs to the second node. It may be said that the second node owns the first node. A behavior-based link represents an access-based relationship between first and second nodes and/or an association-based relationship between the first and second nodes. An access-based relationship between first and second nodes is based at least in part on the first node accessing the second node or the second node accessing the first node. An association-based relationship between first and second nodes is based at least in part on the first node having a relationship with a third node and is further based at least in part on the third node sharing a link (e.g., a configuration-based link or a behavior-based link) with the second node.

In an example implementation, the graph is a directed graph with ordered pair G=(V, E). V is a set of nodes (a.k.a. vertices) representing resources (e.g., cloud entities). Examples of a resource include but are not limited to a store (e.g., local memory or cloud storage); a computing device, such as a server (e.g., SQL server); an account (e.g., a storage account or a user account); a processor (e.g., a central processing unit (CPU)); a virtual machine; a cluster; an Internet protocol (IP) address (e.g., an assigned public IP address); a person; a team; a subscription; a tenant, an alias (e.g., a username) of a user; a role of a user; a control plane object (e.g., a firewall or a policy); and data. Each node in the graph may have one or more node features. Examples of a node features include but are not limited to a node name, a node type (e.g., any type mentioned above), a type of stored data, and a related policy. E is a set of directed edges, which are ordered pairs of the nodes. For instance, E may be represented as $E \subseteq \{(x,y)|(x,y) \in V^2$ and $x \neq y\}$. Each edge in the graph may have one or more edge features. Examples of an edge feature include but are not limited to a link type (e.g., configuration-based or behavior-based), a source name (e.g., ARM or storage), a timestamp (e.g., for behavior-based links), an access type, and a weight.

In accordance with this example implementation, after a learning stage, the links in the graph may represent common access patterns. A link prediction model may be implemented for each new link between previously unconnected nodes. The link prediction model may assign a probability of the link appearing based on e.g., based at least in part on) a current shape of the graph. The link prediction model may use a relatively simple approach (e.g., Jaccard similarity or common neighbors) or a more advanced approach (e.g., graph embedding, such as node2vec (Random walks)). Because the input of the model includes tuples of nodes, which represent links between pairs of nodes, and features of the nodes and links, the graph may be extended so long as more tuples (e.g., recent additions or new sources of data) are added. With each tuple, the amount of information that can be obtained from the graph increases. This process may be referred to as "continuous learning" or "active learning." Various models can run on the graph.

In further accordance with this example implementation, active links with low probability may indicate connections that are abnormal and unexpected under the existing model. Such abnormal or unexpected connections may indicate suspicious connection attempts using compromised resources or a malicious insider. The accuracy of such detection may be relatively high, because it takes into account not only the pair of nodes (e.g., storage account and source IP address) between which the link is defined, but the entire hierarchical structure of the graph (e.g., the storage and the source IP address may belong to the same subscription, which may render the access legitimate) and additional sources of behavior information (e.g., the same IP address was active on a control plane for the same storage previously).

Accordingly, when an attempt to create a new behavior-based link is identified, a probability (e.g., likelihood) of the new behavior-based link being created in the graph is determined, and the probability may indicate whether the new behavior-based link is potentially malicious. For instance, the probability being less than or greater than a probability threshold may indicate that the new behavior-based link is potentially malicious, whereas the probability being greater than the probability threshold may indicate that the new behavior-based link is not malicious. It will be recognized that other factor(s) may be taken into consideration to determine whether the new behavior-based link is potentially malicious.

In an example approach, a graph that includes at least a subset of a plurality of nodes and a plurality of configuration-based links is generated. The nodes represent respective resources in a network-based system. Each configuration-based link represents a hierarchical relationship between a respective pair of the nodes such that a first node in the pair belongs to a second node in the pair. A plurality of behavior-based links is added to the graph based at least in part on traffic logs associated with at least a subset of the resources. Each behavior-based link represents an access-based relationship and/or an association-based relationship. Each access-based relationship is between a respective pair of the nodes and is based at least in part on a first node in the pair accessing a second node in the pair. Each association-based relationship is between a respective pair of nodes, is based at least in part on a first node in the pair having a relationship with a third node, and is further based at least in part on the third node sharing a link with a second node in the pair. An attempt to create a new behavior-based link between a designated first node and a designated second node is identified, wherein the designated first node attempts to access the designated second node. A probability of the new behavior-based link being created in the graph is determined. The probability is based at least in part on the plurality of configuration-based links and the plurality of behavior-based links. The new behavior-based link is identified as a potentially malicious link based at least in part on the probability being less than or equal to a threshold probability. A security action is performed based at least in part on the new behavior-based link being identified as a potentially malicious link. The security action is configured to increase security of the network-based system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
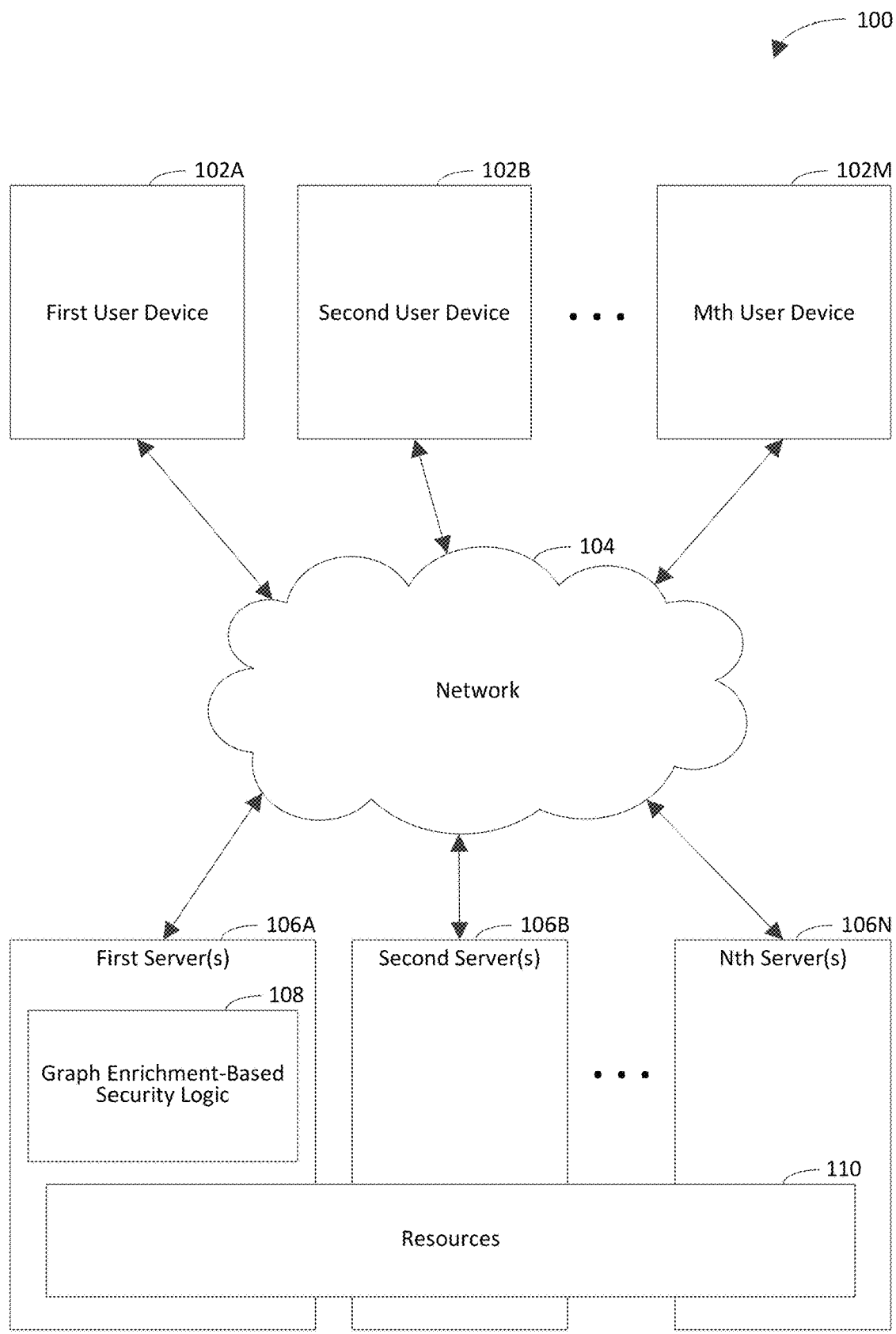
FIG. 1 is a block diagram of an example graph enrichment-based security system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of using graph enrichment to detect a potentially malicious access attempt. Graph enrichment includes generating a graph that includes nodes and configuration-based links and adding behavior-based links to the graph. A configuration-based link represents a hierarchical relationship between a first node and a second such that the first node belongs to the second node. It may be said that the second node owns the first node. A behavior-based link represents an access-based relationship between first and second nodes and/or an association-based relationship between the first and second nodes. An access-based relationship between first and second nodes is based at least in part on the first node accessing the second node or the second node accessing the first node. An association-based relationship between first and second nodes is based at least in part on the first node having a relationship with a third node and is further based at least in part on the third node sharing a link (e.g., a configuration-based link or a behavior-based link) with the second node. The example techniques may be machine-learning-based, rules-based, and/or statistics-based.

In an example implementation, the graph is a directed graph with ordered pair G=(V, E). V is a set of nodes (a.k.a. vertices) representing resources (e.g., cloud entities). Examples of a resource include but are not limited to a store (e.g., local memory or cloud storage); a computing device, such as a server (e.g., SQL server); an account (e.g., a storage account or a user account); a processor (e.g., a central processing unit (CPU)); a virtual machine; a cluster; an Internet protocol (IP) address (e.g., an assigned public IP address); a person; a team; a subscription; a tenant, an alias (e.g., a username) of a user; a role of a user; a control plane object (e.g., a firewall or a policy); and data. Each node in the graph may have one or more node features. Examples of a node features include but are not limited to a node name, a node type (e.g., any type mentioned above), a type of stored data, and a related policy. E is a set of directed edges, which are ordered pairs of the nodes. For instance, E may be represented as $E \subseteq \{(x,y)|(x,y) \in V^2$ and $x \neq y\}$. Each edge in the graph may have one or more edge features. Examples of an edge feature include but are not limited to a link type (e.g., configuration-based or behavior-based), a source name (e.g., ARM or storage), a timestamp (e.g., for behavior-based links), an access type, and a weight.

In accordance with this example implementation, after a learning stage, the links in the graph may represent common access patterns. A link prediction model may be implemented for each new link between previously unconnected nodes. The link prediction model may assign a probability of the link appearing based on e.g., based at least in part on) a current shape of the graph. The link prediction model may use a relatively simple approach (e.g., Jaccard similarity or common neighbors) or a more advanced approach (e.g., graph embedding, such as node2vec (Random walks)). Because the input of the model includes tuples of nodes, which represent links between pairs of nodes, and features of the nodes and links, the graph may be extended so long as more tuples (e.g., recent additions or new sources of data) are added. With each tuple, the amount of information that can be obtained from the graph increases. This process may be referred to as "continuous learning" or "active learning." Various models can run on the graph.

In further accordance with this example implementation, active links with low probability may indicate connections that are abnormal and unexpected under the existing model. Such abnormal or unexpected connections may indicate suspicious connection attempts using compromised resources or a malicious insider. The accuracy of such detection may be relatively high, because it takes into account not only the pair of nodes (e.g., storage account and source IP address) between which the link is defined, but the entire hierarchical structure of the graph (e.g., the storage and the source IP address may belong to the same subscription, which may render the access legitimate) and additional sources of behavior information (e.g., the same IP address was active on a control plane for the same storage previously).

Accordingly, when an attempt to create a new behavior-based link is identified, a probability (e.g., likelihood) of the new behavior-based link being created in the graph is determined. The probability may indicate whether the new behavior-based link is potentially malicious. For instance, the probability being less than or greater than a probability threshold may indicate that the new behavior-based link is potentially malicious, whereas the probability being greater than the probability threshold may indicate that the new behavior-based link is not malicious. Other factor(s) may be taken into consideration to determine whether the new behavior-based link is potentially malicious. In such instances, the probability being less than or greater than the probability threshold may weigh in favor of the new behavior-based link being deemed potentially malicious, and the probability being greater than the probability threshold may weigh in favor of the new behavior-based link being deemed not malicious.

Example techniques described herein have a variety of benefits as compared to conventional techniques for detecting malicious access attempts. For instance, the example techniques may be more efficient, reliable, and/or effective than conventional techniques for detecting a potentially malicious attempt to access a resource, for example, by increasing accuracy and/or precision of the detection. For instance, using a graph to represent resources of a network-based system in which the potentially malicious attempt takes place and relationships between the resources may increase the precision and/or the accuracy, as compared to conventional techniques. Accordingly, the example techniques may have a greater usability and/or increase a user experience of a user regarding detection of the potentially malicious attempt to access the resource. The example techniques may be more scalable than conventional techniques.

Nodes and links may be added to or deleted from the graph on-the-fly (e.g., in real-time). Accordingly, the accuracy and/or precision of the example techniques with regard to detection of the potentially malicious attempt to access the resource may be continuously improved via on-the-fly updating of the graph. The example techniques may increase accuracy and/or precision of a probability associated with a new behavior-based link, which indicates whether the new behavior-based link is potentially malicious, by taking into consideration probabilities of other links in the network-based system to determine the probably associated with the new behavior-based link. The probabilities of the other links may take into consideration existence of the new behavior-based link to increase accuracy and/or precision of those probabilities.

Features can be extracted from configuration-based links in the graph to serve as a starting point for determining probabilities associated with behavior-based links that are added to the graph. Thus, the example techniques may be capable of avoiding a "cold start" issue that is associated with many conventional techniques. The example techniques may expose relationships between resources that are not exposed by conventional techniques for detecting malicious access attempts. The example techniques may be capable of performing a deep search using the graph to identify a relationship among more than two resources.

By using a graph to represent relationships between resources, graph analysis tools can be implemented to provide additional insights beyond detection of potentially malicious attempts to access resources. For example, such tools may calculate a path of an attack and/or a blast radius associated with the attack. In another example, such tools may identify types of connections between resources and/or determine similarity between resources.

The example techniques may reduce an amount of time and/or assets (e.g., processor cycles, memory, network bandwidth) that is consumed to detect a potentially malicious attempt to access a resource. For instance, by using graph enrichment to detect a potentially malicious access attempt, matrix data that indicates non-existence of relationships between respective pairs of resources need not necessarily be analyzed. A computing system that is configured to detect potentially malicious attempts to access a resource may conserve the time and resources that would have been consumed by analyzing such matrix data. By reducing the amount of time and/or resources that is consumed, the example techniques may increase an efficiency of the computing system that is configured to detect the potentially malicious attempts to access the resource.

Security of a network-based system that is targeted by a malicious attempt to access a resource may be increased by identifying the attempt as potentially malicious in accordance with one or more of the example techniques described herein. For instance, as a result of identifying the attempt as potentially malicious, the example techniques may perform a security action (e.g., remedial operation), including but not limited to providing notice of the potentially malicious attempt, preventing the access that is sought by the potentially malicious attempt, and/or mitigating damage that occurs as a result of the potentially malicious attempt (e.g., discontinuing the access).

FIG. 1 is a block diagram of an example graph enrichment-based security system 100 in accordance with an embodiment. Generally speaking, the graph enrichment-based security system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the graph enrichment-based security system 100 increases security of the graph enrichment-based security system 100 by using graph enrichment to detect potentially malicious attempts to access (e.g., use) resources 110. The resources 110 are shown to be distributed across the servers 106A-106N for non-limiting, illustrative purposes. It will be recognized that any one or more of the resources 110 may be accessible via (e.g., included in) any one or more of the user devices 102A-102M and/or any one or more of the servers 106A-106N. Detail regarding techniques for using graph enrichment to detect potentially malicious attempt(s) to access resource(s) is provided in the following discussion.

As shown in FIG. 1, the graph enrichment-based security system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are processing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. Any one or more of the computer programs may be a cloud computing service. A cloud computing service is a service that executes at least in part in the cloud. The cloud may be a remote cloud, an on-premises cloud, or a hybrid cloud. It will be recognized that an on-premises cloud may use remote cloud services. Examples of a cloud computing service include but are not limited to Azure® developed and distributed by Microsoft Corporation, Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., and Rackspace® developed and distributed by Rackspace US, Inc. In accordance with some example embodiments, the servers 106A-106N are configured to host respective Web sites, so that the Web sites are accessible to users of the graph enrichment-based security system 100.

The first server(s) 106A are shown to include graph enrichment-based security logic 108 for illustrative purposes. The graph enrichment-based security logic 108 is configured to increase security of the graph enrichment-based security system 100 by using graph enrichment to detect potentially malicious attempt(s) to access any one or more of the resources 110. The graph enrichment-based security logic 108 generates a graph that includes at least a subset of a plurality of nodes and a plurality of configuration-based links. The nodes represent the respective resources 110. Each configuration-based link represents a hierarchical relationship between a respective pair of the nodes such that a first node in the pair belongs to a second node in the pair. The graph enrichment-based security logic 108 adds a plurality of behavior-based links to the graph based at least in part on information (e.g., traffic logs) associated with at least a subset of the resources 110. Each behavior-based link represents an access-based relationship and/or an association-based relationship. Each access-based relationship is between a respective pair of the nodes and is based at least in part on a first node in the pair accessing a second node in the pair. Each association-based relationship is between a respective pair of nodes, is based at least in part on a first node in the pair having a relationship with a third node, and is further based at least in part on the third node sharing a link with a second node in the pair. The graph enrichment-based security logic 108 detects an attempt to create a new behavior-based link between a designated first node and a designated second node, wherein the designated first node attempts to access the designated second node. The graph enrichment-based security logic 108 determines a probability (e.g., likelihood) of the new behavior-based link being created in the graph. The probability is based at least in part on the plurality of configuration-based links and the plurality of behavior-based links. The graph enrichment-based security logic 108 identifies the new behavior-based link as a potentially malicious link based at least in part on the probability being less than or equal to a threshold probability. The graph enrichment-based security logic 108 performs a security action based at least in part on the new behavior-based link being identified as a potentially malicious link. The security action is configured to increase security of the network-based system.

The graph enrichment-based security logic 108 may use machine learning to perform at least some of its operations. For instance, the graph enrichment-based security logic 108 may use the machine learning to develop and refine the graph, a malicious attempt profile that characterizes potentially malicious access attempts, relationships between nodes in the graph, and probabilities associated with those relationships. The graph enrichment-based security logic 108 may use the machine learning to analyze an attempt to create new behavior-based links, an impact of the new behavior-based link on probabilities associated with other links in the graph, and an impact of those probabilities on a probability associated with the new behavior-based link to determine whether the new behavior-based link is potentially malicious. For instance, graph enrichment-based security logic 108 may make the determination based on whether the probability associated with the new behavior-based link is less than or equal to a probability threshold.

The graph enrichment-based security logic 108 may use a neural network to perform the machine learning to detect a potentially malicious access attempt. The graph enrichment-based security logic 108 may use the malicious attempt profile that characterizes potentially malicious access attempts to determine the potentially malicious access attempt and/or may incorporate the detected potentially malicious access attempt into the malicious attempt profile. Examples of a neural network include but are not limited to a feed forward neural network and a long short-term memory (LSTM) neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example embodiment, the graph enrichment-based security logic 108 employs a feed forward neural network to train a machine learning model that is used to determine ML-based confidences. Such ML-based confidences may be used to determine likelihoods that links are malicious.

An LSTM neural network is a recurrent neural network that has memory and allows data to flow forward and backward in the neural network. The LSTM neural network is capable of remembering values for short time periods or long time periods. Accordingly, the LSTM neural network may keep stored values from being iteratively diluted over time. In one example, the LSTM neural network may be capable of storing information, such as historical configuration-based links, probabilities associated with the historical configuration-based links, historical behavior-based links, probabilities associated with the historical behavior-based links, and historical determinations as to whether new behavior-based links are malicious over time. For instance, the LSTM neural network may generate a malicious link model by utilizing such information. In another example, the LSTM neural network may be capable of remembering relationships between features, such as configuration-based links, probabilities associated with the configuration-based links, behavior-based links, probabilities associated with the behavior-based links, and identified potentially malicious links, and ML-based confidences that are derived therefrom.

The graph enrichment-based security logic 108 may include training logic and inference logic. The training logic is configured to train a machine learning algorithm that the inference logic uses to determine (e.g., infer) the ML-based confidences. For instance, the training logic may provide sample configuration-based links, sample probabilities associated with the configuration-based links, sample behavior-based links, sample probabilities associated with the behavior-based links, sample potentially malicious links, and sample confidences as inputs to the algorithm to train the algorithm. The sample data may be labeled. The machine learning algorithm may be configured to derive relationships between the features (e.g., configuration-based links, probabilities associated with the configuration-based links, behavior-based links, probabilities associated with the behavior-based links, and identified potentially malicious links) and the resulting ML-based confidences. The inference logic is configured to utilize the machine learning algorithm, which is trained by the training logic, to determine the ML-based confidence when the features are provided as inputs to the algorithm.

The graph enrichment-based security logic 108 may be implemented in various ways to increase security of the graph enrichment-based security system 100 by using graph enrichment to detect potentially malicious attempt(s) to access one or more of the resources 110, including being implemented in hardware, software, firmware, or any combination thereof. For example, the graph enrichment-based security logic 108 may be implemented as computer program code configured to be executed in one or more processors. In another example, at least a portion of the graph enrichment-based security logic 108 may be implemented as hardware logic/electrical circuitry. For instance, at least a portion of the graph enrichment-based security logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

The graph enrichment-based security logic 108 may be partially or entirely incorporated in a cloud computing service, though the example embodiments are not limited in this respect.

The graph enrichment-based security logic 108 is shown to be incorporated in the first server(s) 106A for illustrative purposes and is not intended to be limiting. It will be recognized that the graph enrichment-based security logic 108 (or any portion(s) thereof) may be incorporated in any one or more of the user devices 102A-102M. For example, client-side aspects of the graph enrichment-based security logic 108 may be incorporated in one or more of the user devices 102A-102M, and server-side aspects of graph enrichment-based security logic 108 may be incorporated in the first server(s) 106A. In another example, the graph enrichment-based security logic 108 may be distributed among the user devices 102A-102M. In yet another example, the graph enrichment-based security logic 108 may be incorporated in a single one of the user devices 102A-102M. In another example, the graph enrichment-based security logic 108 may be distributed among the server(s) 106A-106N. In still another example, the graph enrichment-based security logic 108 may be incorporated in a single one of the servers 106A-106N.

Figure 2:
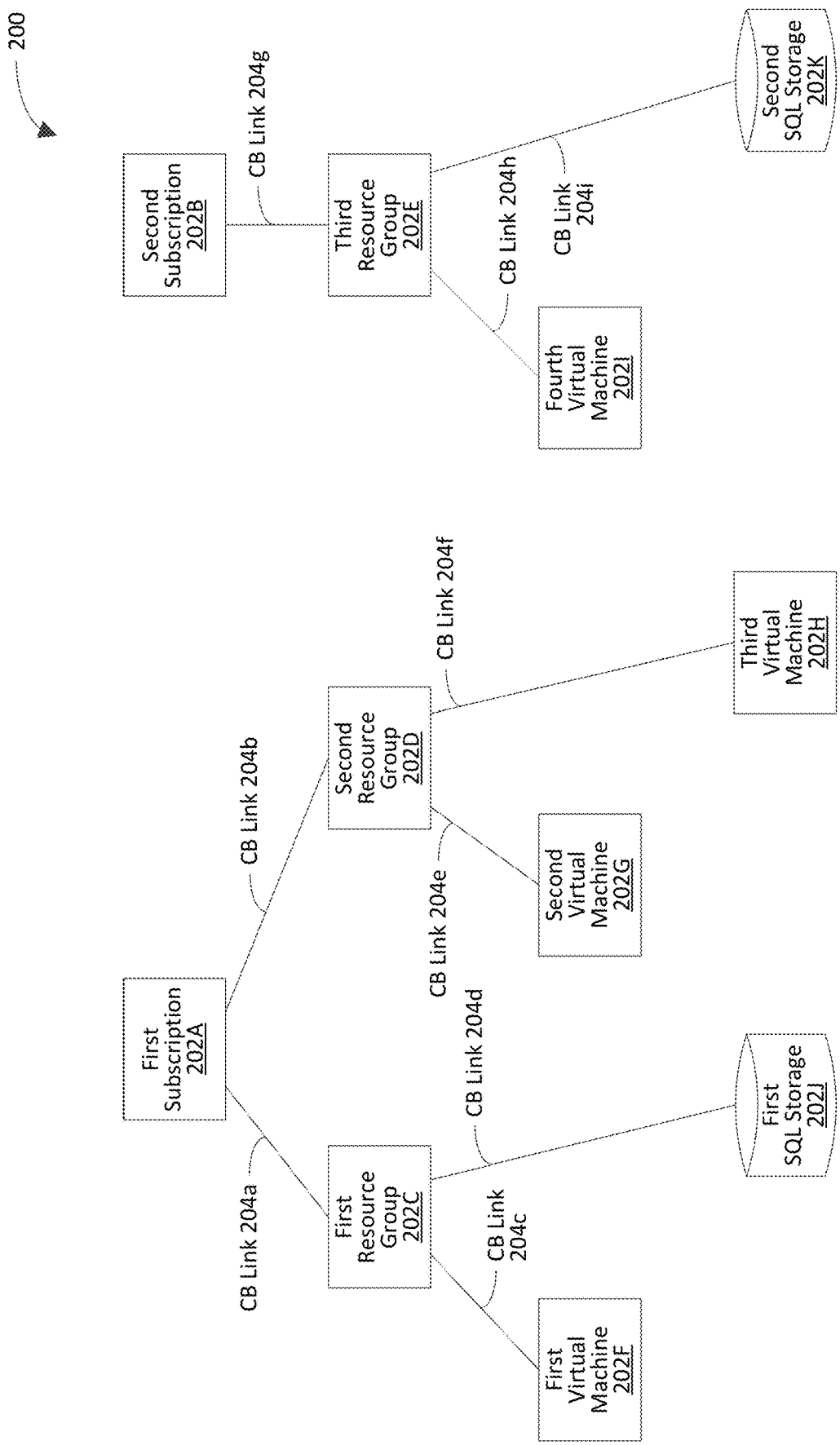
FIG. 2 is a block diagram of an example graph that has been generated to include configuration-based links (labeled "CB links") in accordance with an embodiment.

FIG. 2 is a block diagram of an example graph 200 that has been generated to include configuration-based links (labeled "CB links") 204a-204i in accordance with an embodiment. The graph 200 includes nodes 202A-202K and the links 204a-204i. The nodes 202A-202B represent first and second subscriptions, respectively. The nodes 202C-202E represent first, second, and third resource groups, respectively. The nodes 202F-202I represent first, second, third, and fourth virtual machines, respectively. The nodes 202J-202K represent first and second structured query language (SQL) storages, respectively.

Configuration-based link 204a represents a hierarchical relationship between nodes 202A and 202C in which node 202C belongs to node 202A. For instance, the first subscription represented by node 202A may include the first resource group represented by node 202C. Configuration-based link 204b represents a hierarchical relationship between nodes 202A and 202D in which node 202D belongs to node 202A. For example, the first subscription represented by node 202A may include the second resource group represented by node 202D.

Configuration-based link 204c represents a hierarchical relationship between nodes 202C and 202F in which node 202F belongs to node 202C. For instance, the first resource group represented by node 202C may include the first virtual machine represented by node 202F. Configuration-based link 204d represents a hierarchical relationship between nodes 202C and 202J in which node 202J belongs to node 202C. For example, the first resource group represented by node 202C may include the first SQL storage represented by node 202J.

Configuration-based link 204e represents a hierarchical relationship between nodes 202D and 202G in which node 202G belongs to node 202D. For instance, the second resource group represented by node 202D may include the second virtual machine represented by node 202G. Configuration-based link 204f represents a hierarchical relationship between nodes 202D and 202H in which node 202H belongs to node 202D. For example, the second resource group represented by node 202D may include the third virtual machine represented by node 202H.

Configuration-based link 204g represents a hierarchical relationship between nodes 202B and 202E in which node 202E belongs to node 202B. For instance, the second subscription represented by node 202B may include the third resource group represented by node 202E. Configuration-based link 204h represents a hierarchical relationship between nodes 202E and 202I in which node 202I belongs to node 202E. For example, the third resource group represented by node 202E may include the fourth virtual machine represented by node 202I. Configuration-based link 204i represents a hierarchical relationship between nodes 202E and 202K in which node 202K belongs to node 202E. For example, the third resource group represented by node 202E may include the second SQL storage represented by node 202K.

The nodes 202A-202K and the configuration-based links 204a-204i are shown in FIG. 2 for non-limiting, illustrative purposes. It will be recognized that the graph 200 may include any suitable number of nodes in any suitable hierarchical arrangement, and each node may represent any suitable resource. It will be further recognized that the graph 200 may include any suitable number of configuration-based links, and each configuration-based link may be between any suitable pair of nodes.

Figure 3:
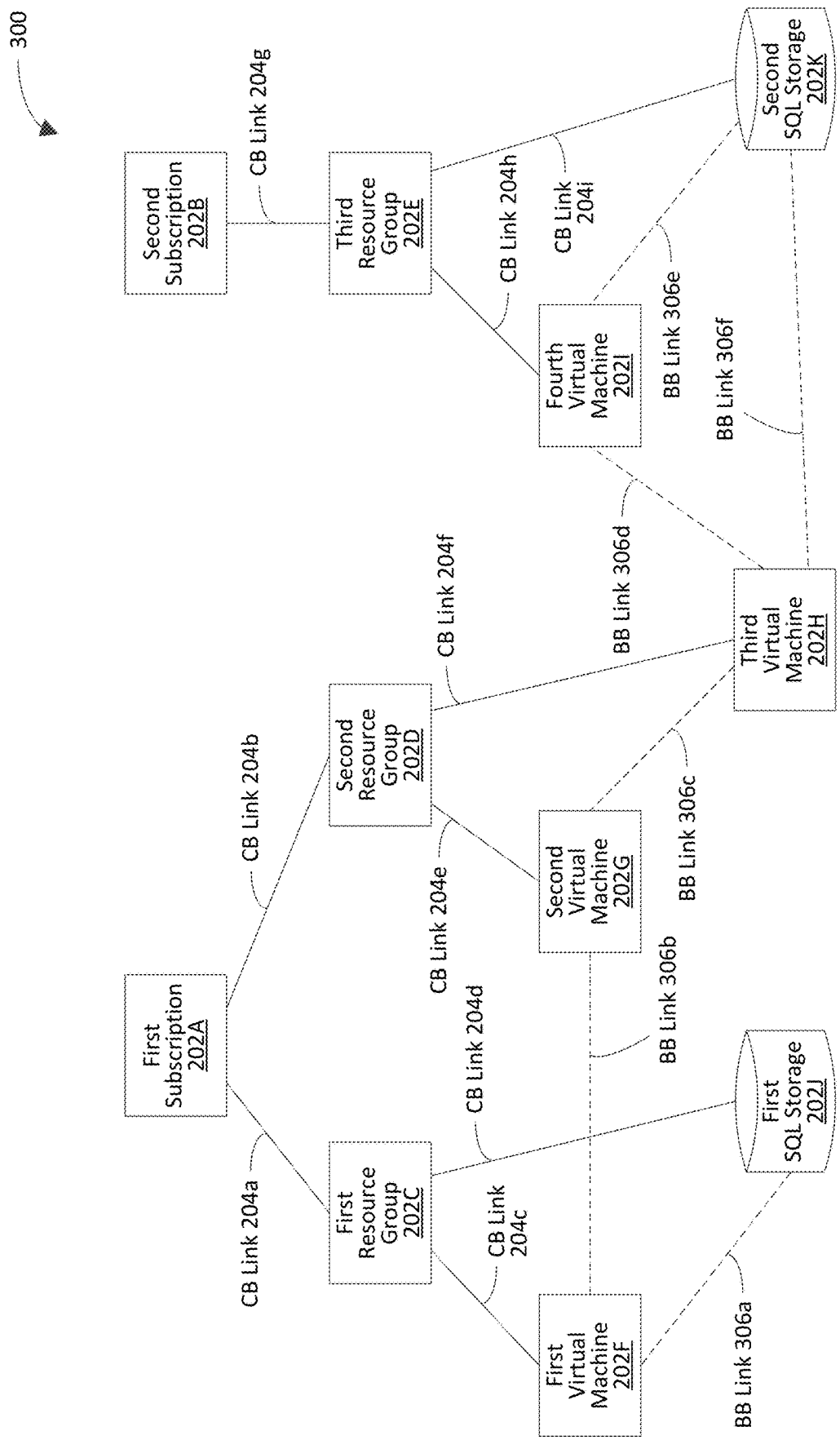
FIG. 3 is a block diagram of an enriched version of the graph shown in FIG. 2 to which behavior-based links (labeled "BB links") have been added in accordance with an embodiment.

FIG. 3 is a block diagram of an enriched version 300 of the graph 200 shown in FIG. 2 to which behavior-based links (labeled "BB links") 314a-314f have been added in accordance with an embodiment. The enriched version 300 of the graph 200 includes the nodes 202A-202K and the configuration-based links 204a-204i described above with reference to FIG. 2. Behavior-based link 306a has been added to indicate that the first virtual machine represented by node 202F has accessed data in the first SQL storage represented by node 202J. Behavior-based link 306b has been added to indicate that the first and second virtual machines represented by respective nodes 202F and 202G have communicated. Behavior-based link 306c has been added to indicate that the second and third virtual machines represented by respective nodes 202G and 202H have communicated. Behavior-based link 306d has been added to indicate that the third and fourth virtual machines represented by respective nodes 202H and 202I have communicated. Behavior-based link 306e has been added to indicate that the fourth virtual machine represented by node 202I has accessed data in the second SQL storage represented by node 202K. Behavior-based link 306f has been added to indicate that the third virtual machine represented by node 202H has accessed data in the second SQL storage represented by node 202K.

The behavior-based links 306a-306f are shown in FIG. 3 for non-limiting, illustrative purposes. It will be recognized that the enriched version 300 of the graph 200 may include any suitable number of behavior-based links, and each behavior-based link may be between any suitable pair of nodes. Moreover, each link may represent any suitable type of relationship between the corresponding pair of resources.

Figure 4A:
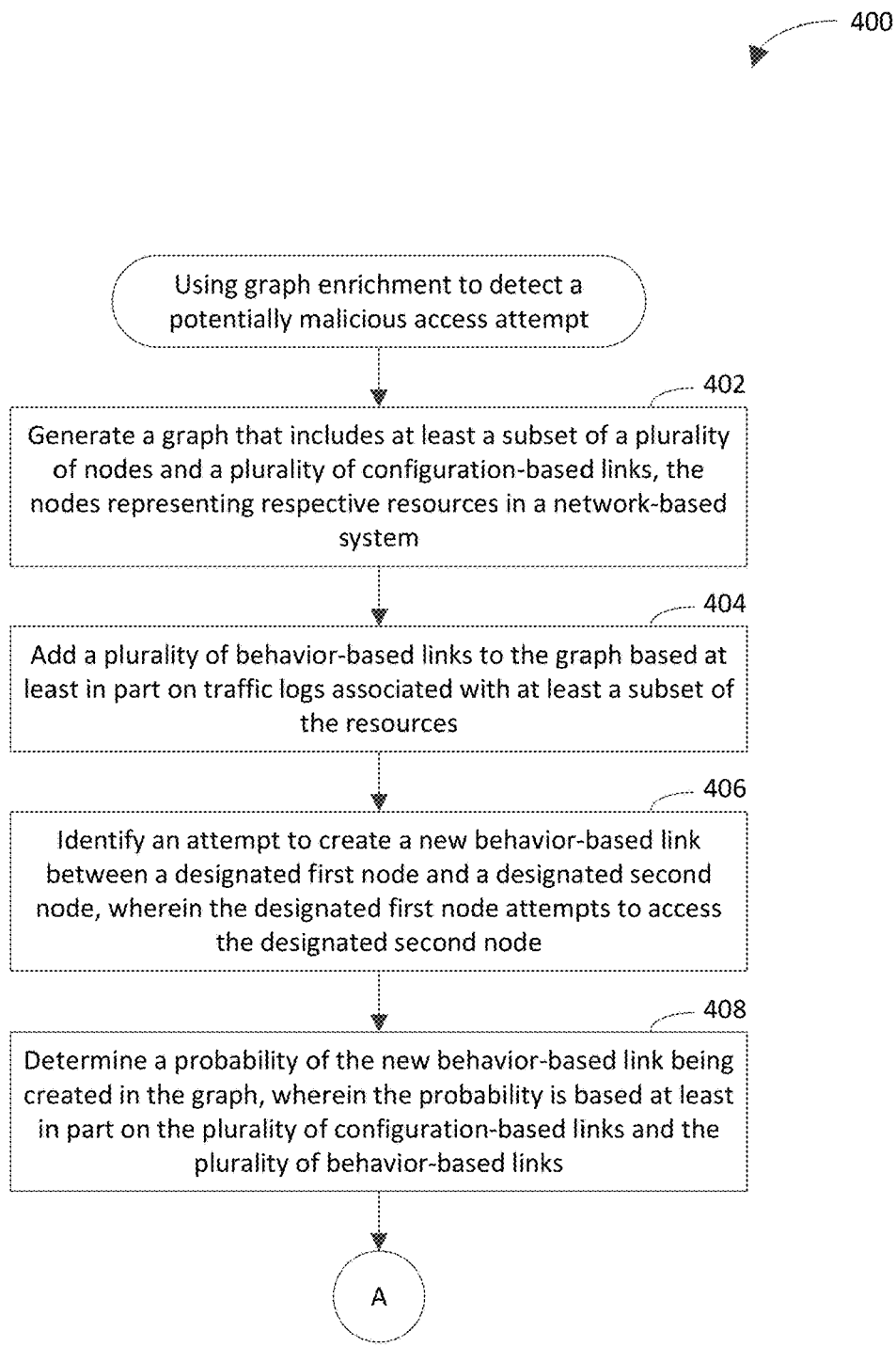
FIGS. 4A-4B depict respective portions of a flowchart of an example method for using graph enrichment to detect a potentially malicious access attempt in accordance with an embodiment.
Figure 4B:
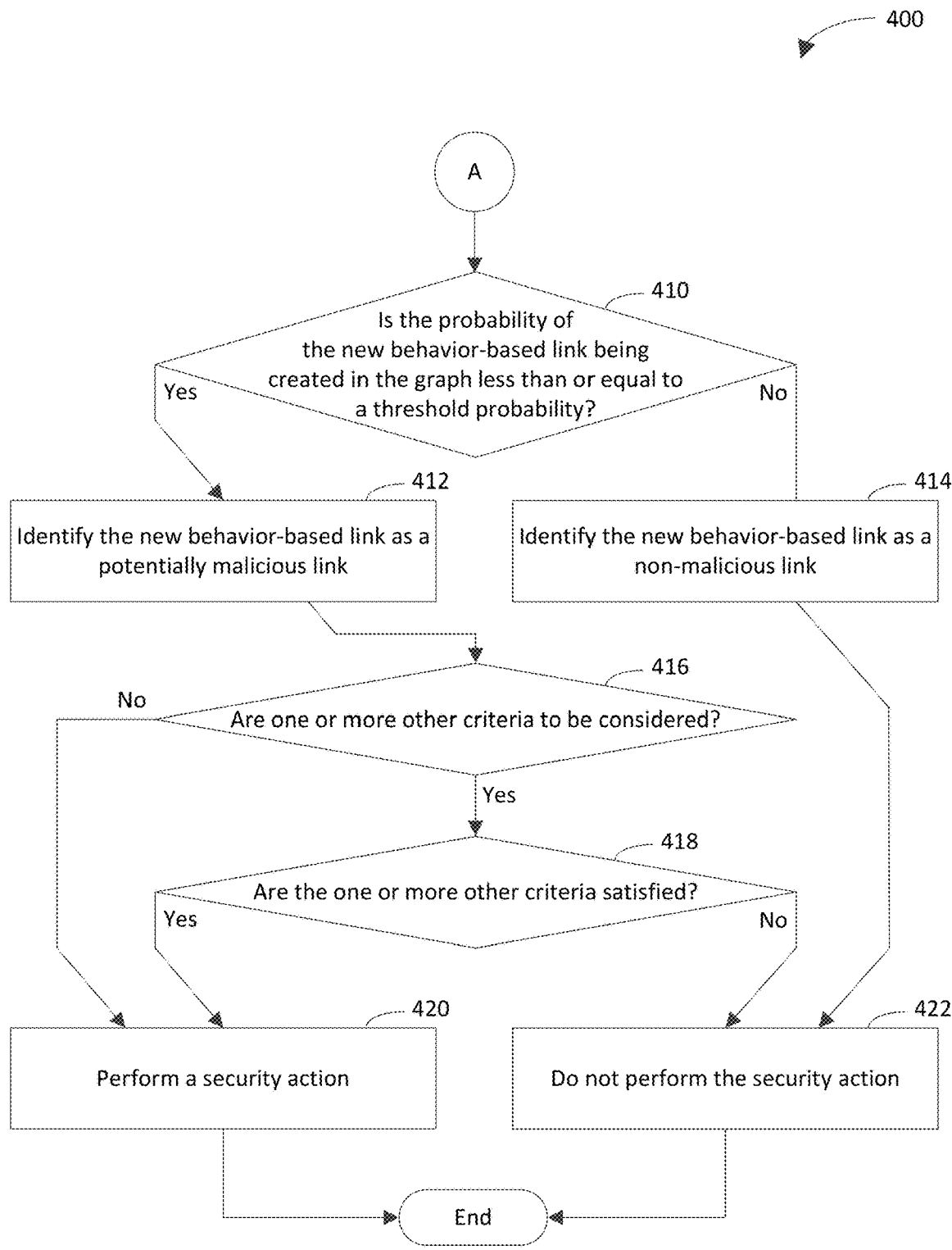
Figure 5:
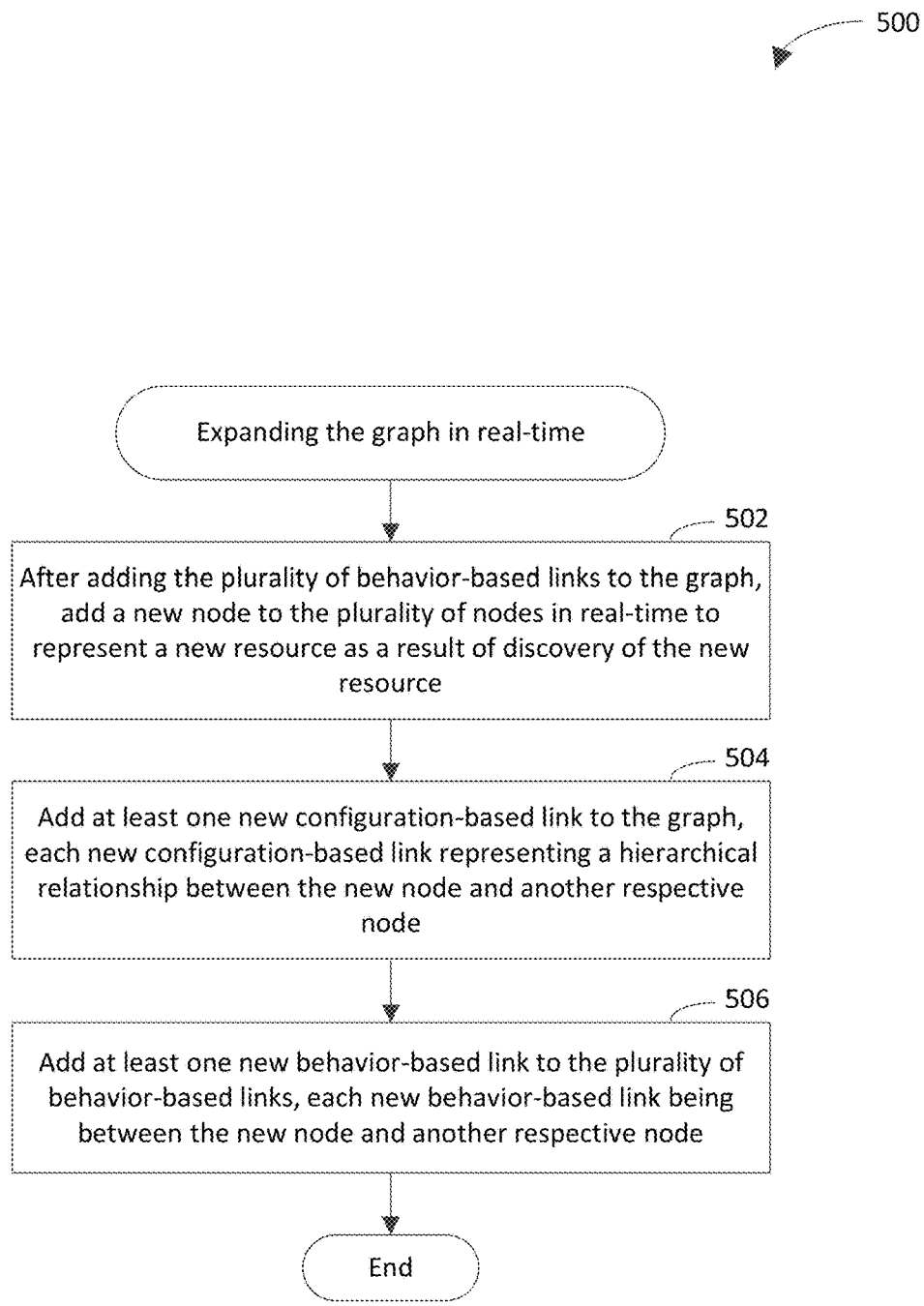
FIG. 5 depicts a flowchart of an example method for expanding a graph in real-time in accordance with an embodiment.
Figure 6:
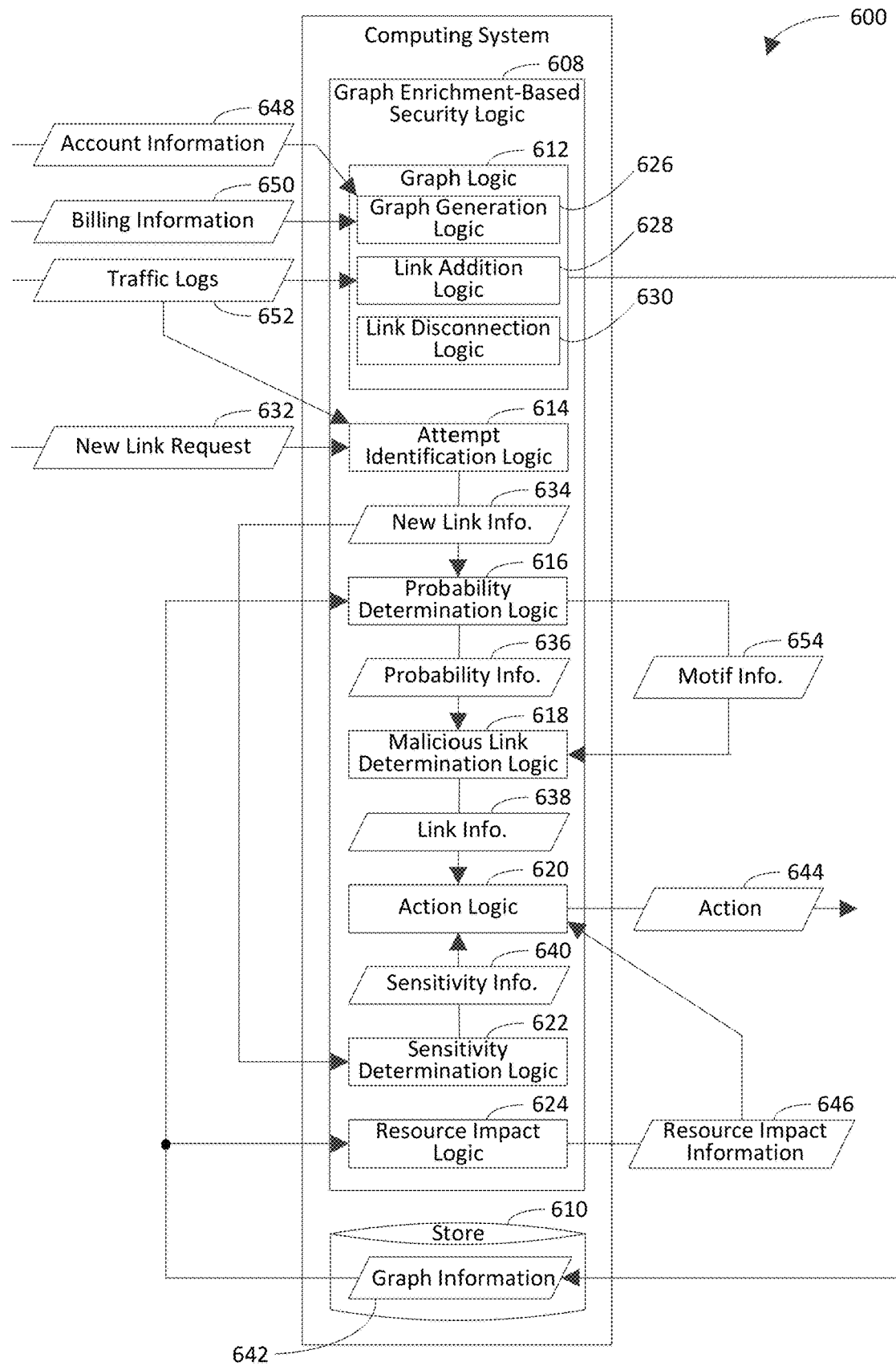
FIG. 6 is a block diagram of an example computing system in accordance with an embodiment.

FIGS. 4A-4B depict respective portions of a flowchart 400 of an example method for using graph enrichment to detect a potentially malicious access attempt in accordance with an embodiment. FIG. 5 depicts a flowchart 500 of an example method for expanding a graph in real-time in accordance with an embodiment. Flowcharts 400 and 500 may be performed by the first server(s) 106A shown in FIG. 1, for example. For illustrative purposes, flowcharts 400 and 500 are described with respect to computing system 600 shown in FIG. 6, which is an example implementation of the first server(s) 106A. As shown in FIG. 6, the computing system 600 includes graph enrichment-based security logic 608 and a store 610. The graph enrichment-based security logic 608 includes graph logic 612, attempt identification logic 614, probability determination logic 616, malicious link determination logic 618, action logic 620, sensitivity determination logic 622, and resource impact logic 624. The graph logic 612 includes graph generation logic 626, link addition logic 628, and link disconnection logic 630. The store 610 may be any suitable type of store. One type of store is a database. For instance, the store 610 may be a relational database, an entity-relationship database, an object database, an object relational database, an extensible markup language (XML) database, etc. The store 610 is shown to store graph information 642 for non-limiting, illustrative purposes. Further structural and operational embodiments will be apparent to persons skilled in the relevant art(s) based on the discussion regarding flowcharts 400 and 500.

As shown in FIG. 4A, the method of flowchart 400 begins at step 402. In step 402, a graph that includes at least a subset of a plurality of nodes and a plurality of configuration-based links is generated. For instance, the subset of the plurality of the nodes may include at least two of the nodes. The nodes represent respective resources in a network-based system. Examples of a resource include but are not limited to a store (e.g., local memory or cloud storage); a computing device, such as a server (e.g., SQL server); an account (e.g., a storage account or a user account); a processor (e.g., a central processing unit (CPU)); a virtual machine; a cluster; an Internet protocol (IP) address (e.g., an assigned public IP address); a person; a team; a subscription; a tenant; an alias (e.g., a username) of a user; a role of a user; a control plane object (e.g., a firewall or a policy); and data. Each configuration-based link represents a hierarchical relationship between a respective pair of the nodes such that a first node in the pair belongs to a second node in the pair. For example, each configuration-based link may be derived from account information or billing information of a user of a cloud computing service. In accordance with this example, the account information may be recorded when the user opens an account to use the cloud computing service. In further accordance with this example, the billing information may be recorded when arrangements are made to pay for the account. For instance, information regarding the user, an account of the user, a subscription of the user, SQL storage that is accessible to the user, an entity that pays for the account of the user and/or the subscription, and other resources associated with the user may be included in the account information and/or the billing information. In an example implementation, the graph generation logic 626 generates the graph. The graph generation logic 626 may generate graph information 642, which describes the graph. For instance, the graph information 642 may describe the nodes and the configuration-based links that are included in the graph. The graph generation logic 626 may analyze (e.g., review) account information 648 and/or billing information 650 of the user to determine the configuration-based links that are to be incorporated into the graph.

In an example embodiment, an identified behavior-based link of the plurality of behavior-based links represents an access-based relationship between an identified pair of nodes. In accordance with this embodiment, the access-based relationship is based at least in part on a first node in the identified pair accessing a second node in the identified pair.

In another example embodiment, an identified behavior-based link of the plurality of behavior-based links represents an association-based relationship between an identified pair of nodes. In accordance with this embodiment, the association-based relationship is based at least in part on a first node in the identified pair having a relationship with a third node.

In further accordance with this embodiment, the association-based relationship is further based at least in part on the third node sharing a link with a second node in the identified pair.

At step 404, a plurality of behavior-based links is added to the graph based at least in part on traffic logs associated with at least a subset of the resources. For instance, each traffic log may be a control plane log or a data plane log. A control plane log indicates (e.g., describes) management operation(s) performed by a resource and/or management operation(s) performed on the resource. Examples of a management operation include but are limited to changing a policy (e.g., an access policy), setting up a firewall, deleting information, and changing an encryption key. A data plane log indicates operation(s) performed on data by a resource. Examples of an operation that is performed on data include but are not limited to writing the data, reading the data, and copying the data. For instance, the data may include documents and/or cryptographic keys. The subset of the resources may include at least a threshold number of the resources. The threshold number may be any positive integer (e.g., one, two, or three).

Each behavior-based link represents an access-based relationship and/or an association-based relationship. Each access-based relationship is a relationship between a respective pair of the nodes and is based at least in part on a first node in the pair accessing a second node in the pair. Each association-based relationship is between a respective pair of nodes, is based at least in part on a first node in the pair having a relationship with a third node, and is further based at least in part on the third node sharing a link (e.g., a configuration-based link and/or a behavior-based link) with a second node in the pair. A first node having a relationship with a third node, as mentioned above with regard to an association-based relationship, may include the first node accessing the third node, the first node being accessed by the third node, and/or the first node having a hierarchical relationship with the third node. For example, the third node may access the first and second nodes (e.g., within same time window). For instance, the third node may represent a user, the first node may represent a desktop computer of the user, and the second node may represent a laptop computer of the user. In another example, the first and second nodes may access the third node (e.g., within same time window).

Each access-based relationship and each association-based relationship may be determined from traffic logs gathered by monitoring logic associated with one or more of the nodes in the graph. For example, monitoring logic may be associated with a virtual machine to record traffic logs regarding operations performed by the virtual machine. In accordance with this example, the traffic logs may indicate (e.g., specify) which operations are performed by the virtual machine, the resources that requested performance of the operations, data that is accessed to perform the operations, and so on. In another example, monitoring logic may be associated with SQL storage to record logs indicating which data in the SQL storage is accessed and which resources access the data. In yet another example, monitoring logic may be included in the network to intercept packets on-the-fly (e.g., in real-time) and to record the source and the destination of each packet. Each resource can maintain its own logs, and the logs from the various resources may be aggregated to determine the behavior-based links that are to be added to the graph, though the example embodiments are not limited in this respect.

In an example implementation, the link addition logic 628 adds the plurality of behavior-based links to the graph. The link addition logic 628 may update the graph information 642 to describe the behavior-based links that are added to the graph. The link addition logic 628 may analyze traffic logs 652 to determine the behavior-based links that are to be incorporated into the graph.

It will be recognized that generating the graph to include the plurality of configuration-based links at step 402 and adding the plurality of behavior-based links to the graph at step 404 may provide increased efficiency, reliability, and/or effectiveness for detecting a potentially malicious access attempt, as compared to conventional techniques. For instance, the enhanced efficiency, reliability, and/or effectiveness may result from an increase in accuracy and/or precision of the detection.

At step 406, an attempt to create a new behavior-based link between a designated first node of the plurality of nodes and a designated second node of the plurality of nodes is identified, wherein the designated first node attempts to access the designated second node. In an example implementation, the attempt identification logic 614 identifies the attempt to create the new behavior-based link between the designated first node and the designated second node. For example, the attempt identification logic 614 may receive (e.g., intercept) a new link request 632 that requests to establish the new behavior-based link between the designated first node and the designated second node. In accordance with this example, the attempt identification logic 614 may identify the attempt based on receipt of the new link request 632 (based on the new link request 632 specifying that a link is to be established between the designated first node and the designated second node). In another example, the attempt identification logic 614 may analyze one or more of the traffic logs 652 that are associated with the designated first node and/or the designated second node to identify the attempt. In accordance with this implementation, the attempt identification logic 614 may generate new link information 634, which describes the new behavior-based link. For instance, the new link information 634 may identify a pair of nodes that are to be linked by the new behavior-based link, which node in the pair is attempting to access the other node in the pair, a type of access that is being attempted, and so on. Example types of access include but are not limited to reading (i.e., a first node reading data from a second node), writing (i.e., a first node writing data to a second node), and communicating (i.e., a first node communicating with a second node).

At step 408, a probability (e.g., likelihood) of the new behavior-based link being created in the graph is determined. The probability is based at least in part on the plurality of configuration-based links and the plurality of behavior-based links. In an example implementation, the probability determination logic 616 determines the probability of the new behavior-based link being created in the graph. For instance, the probability determination logic 616 may analyze the graph information 642 to determine the probability. In an aspect of this implementation, the probability determination logic 616 may update probabilities for the configuration-based links and the behavior-based links in the graph based on existence of the new behavior-based link. For instance, the probability determination logic 616 may update the probabilities for the configuration-based links and the behavior-based links in the graph based on the new link information 634. In accordance with this aspect, the probability determination logic 616 may determine the probability of the new behavior-based link being created in the graph based on the updated probabilities for the configuration-based links and the behavior-based links in the graph. In accordance with this implementation, the probability determination logic 616 may generate probability information 636, which indicates the probability of the new behavior-based link being created in the graph. Upon completion of step 408, flow continues to step 410 in FIG. 4B.

It will be recognized that determining the probability based at least in part on the plurality of configuration-based links and the plurality of behavior-based links at step 408 may provide increased efficiency, reliability, and/or effectiveness for detecting a potentially malicious access attempt, as compared to conventional techniques. For instance, the enhanced efficiency, reliability, and/or effectiveness may result from an increase in accuracy and/or precision of the detection that results from determining the probability based at least in part on the plurality of configuration-based links and the plurality of behavior-based links. Moreover, by increasing accuracy and/or precision of the detection, step 408 may increase security of the network-based system.

At step 410, a determination is made whether the probability of the new behavior-based link being created in the graph is less than or equal to a threshold probability. In an example implementation, the malicious link determination logic 618 determines whether the probability of the new behavior-based link being created in the graph is less than or equal to the threshold probability. For instance, the malicious link determination logic 618 may compare the probability that is indicated by the probability information 636 to the threshold probability to make the determination. If the probability is less than or equal to the threshold probability, flow continues to step 412. Otherwise, flow continues to step 414.

At step 412, the new behavior-based link is identified as a potentially malicious link. In an example implementation, the malicious link determination logic 618 identifies the new behavior-based link as a potentially malicious link based at least in part on the probability of the new behavior-based link being created in the graph being less than or equal to the threshold probability. In accordance with this implementation, the malicious link determination logic 618 may generate link information 638 to indicate that the new behavior-based link is a potentially malicious link. Upon completion of step 412, flow continues to step 416.

At step 414, the new behavior-based link is identified as a non-malicious link. In an example implementation, the malicious link determination logic 618 identifies the new behavior-based link as a non-malicious link based at least in part on the probability of the new behavior-based link being created in the graph being greater than the threshold probability. In accordance with this implementation, the malicious link determination logic 618 may generate link information 638 to indicate that the new behavior-based link is a non-malicious link. Upon completion of step 414, flow continues to step 422.

At step 416, a determination is made whether one or more other criteria (e.g., besides whether the probability of the new behavior-based link being created in the graph is less than or equal to the threshold probability) are to be considered. In an example implementation, action logic 620 determines whether the one or more other criteria are to be considered. For example, the action logic 620 may make the determination based on one or more settings of the action logic 620. In accordance with this example, the action logic 620 may have a setting associated with each criterion that is capable of being considered for purposes of determining whether a security action is to be performed with regard to the new behavior-based link. Each setting having a first value (e.g., "0") may indicate that the corresponding criterion is not to be considered, whereas the setting having a second value (e.g., "1") may indicate that the corresponding criterion is to be considered. Examples of a criterion that may be considered include but are not limited to a confidence in accuracy of the probability being greater than or equal to a confidence threshold, sensitivity of data associated with the designated second node being greater than or equal to a sensitivity threshold, a number of resources whose performance is expected to be negatively impacted by creation of the new behavior-based link being greater than or equal to a number threshold, and an extent to which performance of the resources is expected to be negatively impacted by creation of the new behavior-based link being greater than or equal to an extent threshold. If the one or more criteria are to be considered, flow continues to step 418. Otherwise, flow continues to step 420.

At step 418, a determination is made whether the one or more other criteria are satisfied. In an example implementation, the action logic 620 determines whether the one or more other criteria are satisfied. For instance, the action logic 620 may compare a factor associated with each other criterion to a corresponding threshold to determine whether the respective criterion is satisfied. In one example, the factor being greater than or equal to the corresponding threshold may indicate that the criterion is satisfied, and the factor being less than the corresponding threshold may indicate that the criterion is not satisfied. In another example, the factor being less than or equal to the corresponding threshold may indicate that the criterion is satisfied, and the factor being greater than the corresponding threshold may indicate that the criterion is not satisfied. If the one or more criteria are satisfied, flow continues to step 420. Otherwise, flow continues to step 422.

At step 420, a security action is performed. The security action is configured to increase security of the network-based system. Examples of a security action included but are not limited to preventing the new behavior-based link from being established, creating or modifying a firewall to block creation of future instances of the new behavior-based link, generating an alert indicating that the new behavior-based link is potentially malicious, and notifying a security researcher about the attempt to create the new behavior-based link to enable the security researcher to investigate whether the attempt is part of a broader malicious attack campaign. In an example implementation, the action logic 620 performs the security action. Upon completion of step 420, flowchart 400 ends.

In an example embodiment, performing the security action at step 420 includes providing an alert to an entity associated with the network-based system based at least in part on the new behavior-based link being identified as a potentially malicious link. The alert indicates that the new behavior-based link between the designated first node and the designated second node is potentially malicious. For instance, the alert may be provided to an information technology (IT) professional. In one example, the alert may be provided to a network administrator (e.g., a network administrator of the network-based system). In an aspect of this example, the alert may request confirmation as to whether identification of the new behavior-based link as a potentially malicious link is to be maintained. For instance, performance of a subsequent action may be based at least in part on receipt of the confirmation. In another aspect of this example, a determination may be made that a proxy server in the network-based system does not have access rules regarding the designated first node. The access rules indicate which of the plurality of resources the designated first node is authorized to access. In accordance with this aspect, providing the alert may include proposing disconnection of the designated first node from the proxy server. In another example, the alert may be provided to a security researcher. In accordance with this example, the alert may enable the security researcher to identify a malicious entity that attempted to create the new behavior-based link.

In another example embodiment, performing the security action at step 420 includes not allowing creation of the new behavior-based link between the designated first node and the designated second node based at least in part on the new behavior-based link being identified as a potentially malicious link. For instance, not allowing creation of the new behavior-based link may include not enabling the new behavior-based link to be created and/or inhibiting (e.g., preventing) creation of the new behavior-based link.

At step 422, the security action is not performed. In an example implementation, the action logic 620 does not perform the security action. Upon completion of step 422, flowchart 400 ends.

In an example embodiment, identifying the attempt to create the new behavior-based link at step 406 includes determining that the new behavior-based link between the designated first node and the designated second node is (e.g., has been) created. In accordance with this embodiment, performing the security action at step 420 includes disconnecting the new behavior-based link between the designated first node and the designated second node based at least in part on the new behavior-based link being identified as a potentially malicious link.

In some example embodiments, one or more steps 402, 404, 406, 408, 410, 412, 414, 416, 418, 420, and/or 422 of flowchart 400 may not be performed. Moreover, steps in addition to or in lieu of steps 402, 404, 406, 408, 410, 412, 414, 416, 418, 420, and/or 422 may be performed. For instance, in an example embodiment, the method of flowchart 400 further includes determining that a motif in the graph is associated with malicious activity. A motif (a.k.a. a network motif) is a recurrent and statistically significant subgraph or pattern in the graph. For instance, the motif may be defined by a designated pattern of interactions between nodes that are included in the motif. In an example, the probability determination logic 616 may determine that the motif in the graph is associated with malicious activity. In an aspect, the probability determination logic 616 may analyze the graph information 642 to identify the motif in the graph and to determine that the motif is associated with malicious activity. For instance, the graph information 642 may list a variety of motifs that are included in the graph. The graph information 642 may also indicate whether each motif in the graph is associated with malicious activity. The probability determination logic 616 may locate the motif in the list and review at least a portion of the graph information 642 that is associated with the motif to determine that the motif is associated with malicious activity. In accordance with this embodiment, the method of flowchart 400 further includes determining that the motif includes the new behavior-based link. For instance, the probability determination logic 616 may determine that the motif includes the new behavior-based link. In an example, the probability determination logic 616 may query the graph to identify which of the plurality of nodes and which of the plurality of behavior-based links are included in the motif. By comparing the results of the query to an identifier associated with the new behavior-based link, the probability determination logic 616 may determine that the motif includes the new behavior-based link based on the identifier being included in the results of the query. The probability determination logic 616 may generate motif information 654 to indicate that the motif includes the new behavior-based link. In further accordance with this embodiment, identifying the new behavior-based link as a potentially malicious link at step 412 is further based at least in part on the motif including the new behavior-based link. For instance, the malicious link determination logic 618 may analyze the motif information 654 to determine that the motif includes the new behavior-based link. The malicious link determination logic 618 may identify the new behavior-based link as a potentially malicious link based at least in part on the motif information indicating that the motif includes the new behavior-based link.

In another example embodiment, the method of flowchart 400 further includes determining a plurality of link probabilities (e.g., likelihoods) of the plurality of respective behavior-based links being created in the graph. Each link probability is based at least in part on the configuration-based links, the other behavior-based links in the plurality of behavior-based links, and the new behavior-based link. For example, the probability determination logic 616 may determine (e.g., update) each of the link probabilities based at least in part on the configuration-based links, the other behavior-based links in the plurality of behavior-based links, and the new behavior-based link. In accordance with this example, the probability determination logic 616 may analyze the graph information 642 to determine the configuration-based links and the behavior-based links. By analyzing the graph information 642, the probability determination logic 616 may also determine initial probabilities associated with the configuration-based links and the behavior-based links. The probability determination logic 616 may analyze the new link information 634 to determine the new behavior-based link. If the initial probabilities are associated with the configuration-based links and the behavior-based links, the probability determination logic 616 may update the initial probabilities based on knowledge of the new behavior-based link to determine the plurality of link probabilities. In accordance with this embodiment, determining the probability of the new behavior-based link being created in the graph at step 408 is based at least in part on the plurality of link probabilities of the plurality of respective behavior-based links. For instance, the probability determination logic 616 may determine the probability of the new behavior-based link being created in the graph based at least in part on the plurality of link probabilities.

In yet another example embodiment, the method of flowchart 400 further includes comparing the probability of the new behavior-based link being created in the graph to a second threshold probability that is less than the first threshold probability. For instance, the probability determination logic 616 may compare the probability of the new behavior-based link being created in the graph to the second threshold probability. The probability determination logic 616 may generate the probability information 636 to indicate whether the probability of the new behavior-based link being created in the graph is less than or equal to the second threshold probability. In accordance with this embodiment, performing the security action at step 420 includes performing either a first action or a second action depending on whether the probability of the new behavior-based link being created in the graph is less than or equal to the second threshold probability. For example, if the probability of the new behavior-based link being created in the graph is not less than or equal to the second threshold probability (i.e., if the probability is greater than the second threshold probability), the first action is performed. The first action includes providing an alert to an entity associated with the network-based system. The alert indicates that the new behavior-based link between the designated first node and the designated second node is potentially malicious. In another example, if the probability of the new behavior-based link being created in the graph is less than or equal to the second threshold probability, the second action is performed. The second action includes not allowing creation of the new behavior-based link between the designated first node and the designated second node. For example, the malicious link determination logic 618 may analyze the probability information 636 to determine whether the probability of the new behavior-based link being created in the graph is less than or equal to the second threshold probability. In accordance with this example, the malicious link determination logic 618 may perform either the first action or the second action depending on whether probability information 636 indicates that the probability of the new behavior-based link being created in the graph is less than or equal to the second threshold probability.

In still another example embodiment, the method of flowchart 400 further includes determining a confidence in an accuracy of the probability of the new behavior-based link being created in the graph. For instance, the probability determination logic 616 may determine the confidence. The probability determination logic 616 may generate the probability information 636 to indicate the confidence, and the malicious link determination logic 618 may include an indication of the confidence in the link information 638. In accordance with this embodiment, the method of flowchart 400 further includes comparing the confidence to a confidence threshold. For example, the action logic 620 may compare the confidence to the confidence threshold. In accordance with this example, the action logic 620 may analyze the link information 638 to determine the confidence, which is then compared to the confidence threshold. In further accordance with this embodiment, performing the security action at step 420 is further based at least in part on the confidence being greater than or equal to the confidence threshold.

In an example embodiment, the method of flowchart 400 further includes determining a sensitivity of data associated with the designated second node. For example, the sensitivity determination logic 622 may determine the sensitivity of the data associated with the designated second node. In accordance with this example, the sensitivity determination logic 622 may analyze the new link information 634 to determine the sensitivity. The sensitivity determination logic 622 may generate sensitivity information 640 to indicate the sensitivity. In accordance with this embodiment, the method of flowchart 400 further includes comparing the sensitivity to a sensitivity threshold. For example, the action logic 620 may compare the sensitivity to the sensitivity threshold. In accordance with this example, the action logic 620 may analyze the sensitivity information 640 to determine the sensitivity, which is then compared to the sensitivity threshold. In further accordance with this embodiment, performing the security action at step 420 is further based at least in part on the sensitivity being greater than or equal to the sensitivity threshold.

In another example embodiment, the method of flowchart 400 further includes determining a number of the plurality of resources whose performance is to be reduced (e.g., negatively impacted) by creation of the new behavior-based link. For instance, the resource impact logic 624 may determine the number of the plurality of resources whose performance is likely to be (e.g., will be) reduced by creation of the new behavior-based link. The resource impact logic 624 may generate resource impact information 646 to indicate the number of the plurality of resources whose performance is likely to be reduced by creation of the new behavior-based link. In accordance with this embodiment, performing the security action at step 420 includes providing a notification to an entity associated with the network-based system based at least in part on the new behavior-based link being identified as a potentially malicious link. In further accordance with this embodiment, the notification indicates the number of the plurality of resources whose performance is to be reduced by the creation of the new behavior-based link. For instance, the action logic 620 may provide the notification to indicate the number of the plurality of resources whose performance is likely to be reduced by creation of the new behavior-based link.

In yet another example embodiment, the method of flowchart 400 further includes determining an extent to which performance of the plurality of resources is to be reduced by creation of the new behavior-based link. For instance, the resource impact logic 624 may determine the extent to which the performance of the plurality of resources is likely to be (e.g., will be) reduced by creation of the new behavior-based link. The resource impact logic 624 may generate resource impact information 646 to indicate the extent to which the performance of the plurality of resources is likely to be reduced by creation of the new behavior-based link. In accordance with this embodiment, performing the security action at step 420 includes providing a notification to an entity associated with the network-based system based at least in part on the new behavior-based link being identified as a potentially malicious link. In further accordance with this embodiment, the notification indicates the extent to which the performance of the plurality of resources is to be reduced by creation of the new behavior-based link. For instance, the action logic 620 may provide the notification to indicate the extent to which the performance of the plurality of resources is likely to be reduced by creation of the new behavior-based link.

In still another example embodiment, the method of flowchart 400 includes one or more of the steps shown in flowchart 500 of FIG. 5. As shown in FIG. 5, the method of flowchart 500 begins at step 502. In step 502, after adding the plurality of behavior-based links to the graph at step 404, a new node is added to the plurality of nodes in real-time to represent a new resource as a result of discovery of the new resource. In an example implementation, the graph generation logic 626 adds the new node to the plurality of nodes in real-time. For instance, the graph generation logic 626 may discover the new resource by analyzing the account information 648 and/or the billing information 650. The graph generation logic 626 may add the new node to the graph as a result of discovering the new resource.

At step 504, at least one new configuration-based link is added to the graph. Each new configuration-based link represents a hierarchical relationship between the new node and another respective node of the plurality of nodes. In an example implementation, the graph generation logic 626 adds at least one new configuration-based link to the graph. For example, the graph generation logic 626 may analyze the account information 648 and/or the billing information 650 to determine a hierarchical relationship of the new node among the other nodes in the graph. In accordance with this example, the graph generation logic 626 may add the at least one new configuration-based link based on the determined relationship of the new node among the other nodes in the graph.

At step 506, at least one new behavior-based link is added to the plurality of behavior-based links. Each new behavior-based link is between the new node and another respective node of the plurality of nodes. In an example implementation, the link addition logic 628 adds at least one new behavior-based link to the plurality of behavior-based links. For instance, the link addition logic 628 may analyze the traffic logs 652 to determine the at least one new behavior-based link to be added to the plurality of behavior-based links (e.g., based on interaction(s) between the new node and other node(s) in the graph, as indicated by the traffic logs 652).

It will be recognized that the computing system 600 may not include one or more of the graph enrichment-based security logic 608, the store 610, the graph logic 612, the attempt identification logic 614, the probability determination logic 616, the malicious link determination logic 618, the action logic 620, the sensitivity determination logic 622, the resource impact logic 624, the graph generation logic 626, the link addition logic 628, and/or the link disconnection logic 630. Furthermore, the computing system 600 may include components in addition to or in lieu of the graph enrichment-based security logic 608, the store 610, the graph logic 612, the attempt identification logic 614, the probability determination logic 616, the malicious link determination logic 618, the action logic 620, the sensitivity determination logic 622, the resource impact logic 624, the graph generation logic 626, the link addition logic 628, and/or the link disconnection logic 630.

Figure 7:
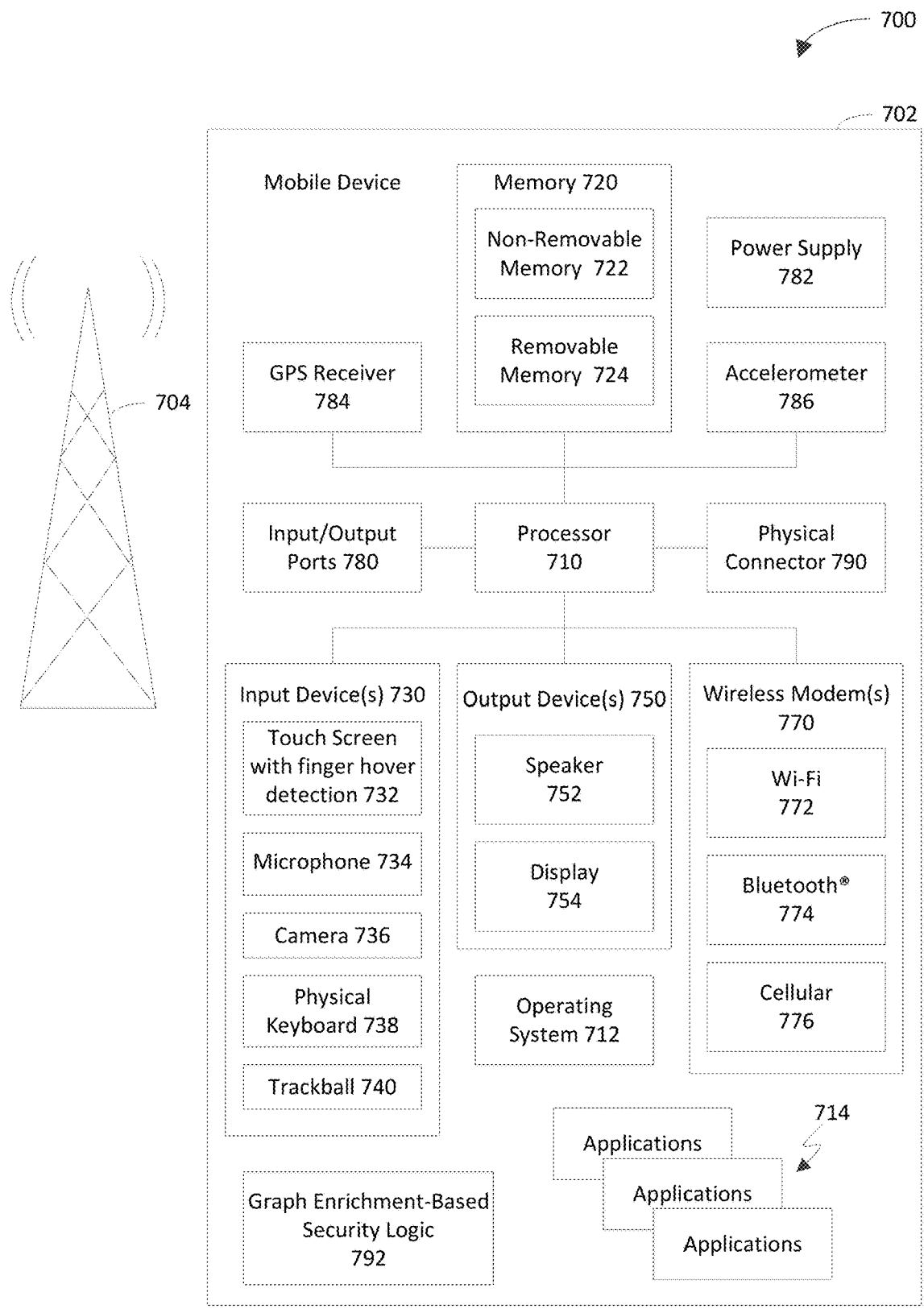
FIG. 7 is a system diagram of an exemplary mobile device in accordance with an embodiment.

FIG. 7 is a system diagram of an exemplary mobile device 700 including a variety of optional hardware and software components, shown generally as 702. Any components 702 in the mobile device may communicate with any other component, though not all connections are shown, for ease of illustration. The mobile device 700 may be any of a variety of computing devices (e.g., cell phone, smartphone, handheld computer, Personal Digital Assistant (PDA), etc.) and may allow wireless two-way communications with one or more mobile communications networks 704, such as a cellular or satellite network, or with a local area or wide area network.

The mobile device 700 may include a processor 710 (e.g., signal processor, microprocessor, ASIC, or other control and processing logic circuitry) for performing such tasks as signal coding, data processing, input/output processing, power control, and/or other functions. An operating system 712 may control the allocation and usage of the components 702 and support for one or more applications 714 (a.k.a. application programs). The applications 714 may include common mobile computing applications (e.g., email applications, calendars, contact managers, web browsers, messaging applications) and any other computing applications (e.g., word processing applications, mapping applications, media player applications).

The mobile device 700 may include memory 720. The memory 720 may include non-removable memory 722 and/or removable memory 724. The non-removable memory 722 may include RAM, ROM, flash memory, a hard disk, or other well-known memory storage technologies. The removable memory 724 may include flash memory or a Subscriber Identity Module (SIM) card, which is well known in GSM communication systems, or other well-known memory storage technologies, such as "smart cards." The memory 720 may store data and/or code for running the operating system 712 and the applications 714. Example data may include web pages, text, images, sound files, video data, or other data sets to be sent to and/or received from one or more network servers or other devices via one or more wired or wireless networks. Memory 720 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 700 may support one or more input devices 730, such as a touch screen 732, microphone 734, camera 736, physical keyboard 738 and/or trackball 740 and one or more output devices 750, such as a speaker 752 and a display 754. Touch screens, such as the touch screen 732, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 732 may support a finger hover detection using capacitive sensing, as is well understood in the art. Other detection techniques may be used, including but not limited to camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

The mobile device 700 may include graph enrichment-based security logic 792. The graph enrichment-based security logic 792 is configured to use graph enrichment to detect a potentially malicious access attempt in accordance with any one or more of the techniques described herein.

Other possible output devices (not shown) may include piezoelectric or other haptic output devices. Some devices may serve more than one input/output function. For example, touch screen 732 and display 754 may be combined in a single input/output device. The input devices 730 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 712 or applications 714 may include speech-recognition software as part of a voice control interface that allows a user to operate the mobile device 700 via voice commands. Furthermore, the mobile device 700 may include input devices and software that allows for user interaction via a user's spatial gestures, such as detecting and interpreting gestures to provide input to a gaming application.

Wireless modem(s) 770 may be coupled to antenna(s) (not shown) and may support two-way communications between the processor 710 and external devices, as is well understood in the art. The modem(s) 770 are shown generically and may include a cellular modem 776 for communicating with the mobile communication network 704 and/or other radio-based modems (e.g., Bluetooth® 774 and/or Wi-Fi 772). At least one of the wireless modem(s) 770 is typically configured for communication with one or more cellular networks, such as a GSM network for data and voice communications within a single cellular network, between cellular networks, or between the mobile device and a public switched telephone network (PSTN).

The mobile device may further include at least one input/output port 780, a power supply 782, a satellite navigation system receiver 784, such as a Global Positioning System (GPS) receiver, an accelerometer 786, and/or a physical connector 790, which may be a USB port, IEEE 1394 (FireWire) port, and/or RS-232 port. The illustrated components 702 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the graph enrichment-based security logic 108, the graph enrichment-based security logic 608, the store 610, the graph logic 612, the attempt identification logic 614, the probability determination logic 616, the malicious link determination logic 618, the action logic 620, the sensitivity determination logic 622, the resource impact logic 624, the graph generation logic 626, the link addition logic 628, the link disconnection logic 630, the graph enrichment-based security logic 792, flowchart 400, and/or flowchart 500 may be implemented in hardware, software, firmware, or any combination thereof.

For example, any one or more of the graph enrichment-based security logic 108, the graph enrichment-based security logic 608, the store 610, the graph logic 612, the attempt identification logic 614, the probability determination logic 616, the malicious link determination logic 618, the action logic 620, the sensitivity determination logic 622, the resource impact logic 624, the graph generation logic 626, the link addition logic 628, the link disconnection logic 630, the graph enrichment-based security logic 792, flowchart 400, and/or flowchart 500 may be implemented, at least in part, as computer program code configured to be executed in one or more processors.

In another example, any one or more of the graph enrichment-based security logic 108, the graph enrichment-based security logic 608, the store 610, the graph logic 612, the attempt identification logic 614, the probability determination logic 616, the malicious link determination logic 618, the action logic 620, the sensitivity determination logic 622, the resource impact logic 624, the graph generation logic 626, the link addition logic 628, the link disconnection logic 630, the graph enrichment-based security logic 792, flowchart 400, and/or flowchart 500 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
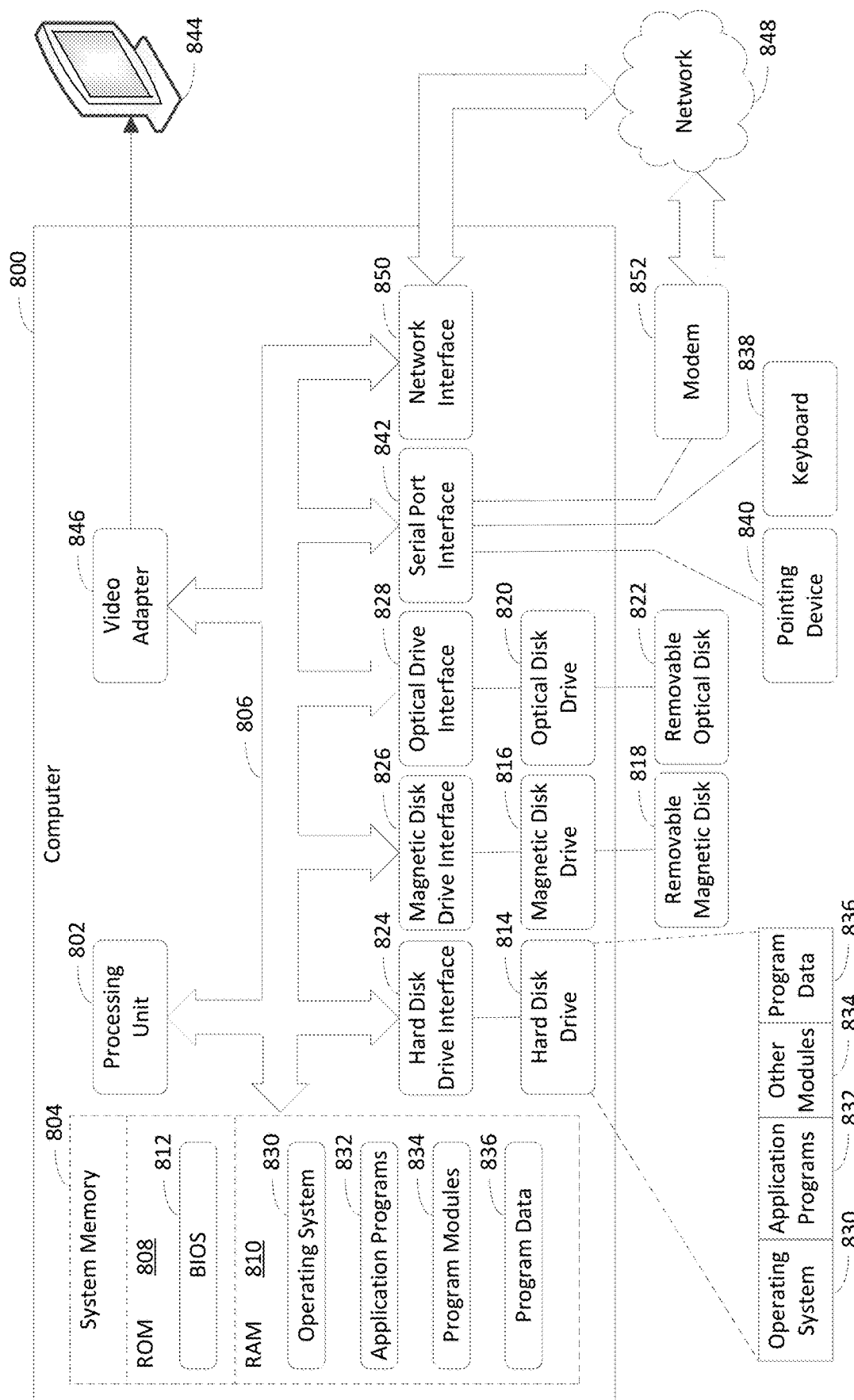
FIG. 8 depicts an example computer in which embodiments may be implemented.

III. Further Discussion of Some Example Embodiments (A1) An example system (FIG. 1, 102A-102M or 106A-106N; FIG. 6, 600; FIG. 7, 702; FIG. 8, 800) to use graph enrichment to detect a malicious access attempt comprises a memory (FIG. 7, 720, 722, 724; FIG. 8, 804, 808, 810) and a processing system (FIG. 7, 710; FIG. 8, 802) coupled to the memory. The processing system is configured to generate (FIG. 4A, 402) a graph that includes at least a subset of a plurality of nodes and a plurality of configuration-based links. The plurality of nodes represents a plurality of respective resources (FIG. 1, 110) in a network-based system (FIG. 1, 100). Each configuration-based link represents a hierarchical relationship between a respective pair of the nodes such that a first node in the pair belongs to a second node in the pair. The processing system is further configured to add (FIG. 4A, 404) a plurality of behavior-based links to the graph based at least in part on traffic logs (FIG. 6, 652) associated with at least a subset of the resources. Each behavior-based link represents at least one of the following: an access-based relationship between a respective pair of the nodes, which is based at least in part on a first node in the pair accessing a second node in the pair; or an association-based relationship between a respective pair of nodes, which is based at least in part on a first node in the pair having a relationship with a third node and which is further based at least in part on the third node sharing a link with a second node in the pair. The processing system is further configured to identify (FIG. 4A, 406) an attempt to create a new behavior-based link between a designated first node of the plurality of nodes and a designated second node of the plurality of nodes, wherein the designated first node attempts to access the designated second node. The processing system is further configured to determine (FIG. 4A, 408) a probability of the new behavior-based link being created in the graph, wherein the probability is based at least in part on the plurality of configuration-based links and the plurality of behavior-based links. The processing system is further configured to identify (FIG. 4B, 412) the new behavior-based link as a potentially malicious link based at least in part on the probability of the new behavior-based link being created in the graph being less than or equal to a threshold probability. The processing system is further configured to perform (FIG. 4B, 420) a security action based at least in part on the new behavior-based link being identified as a potentially malicious link, the security action configured to increase security of the network-based system.

(A2) In the example system of A1, wherein an identified behavior-based link of the plurality of behavior-based links represents an access-based relationship between an identified pair of nodes, which is based at least in part on a first node in the identified pair accessing a second node in the identified pair.

(A3) In the example system of any of A1-A2, wherein an identified behavior-based link of the plurality of behavior-based links represents an association-based relationship between an identified pair of nodes, which is based at least in part on a first node in the identified pair having a relationship with a third node and which is further based at least in part on the third node sharing a link with a second node in the identified pair.

(A4) In the example system of any of A1-A3, wherein the processing system is configured to: determine a plurality of link probabilities of the plurality of respective behavior-based links being created in the graph, wherein each link probability is based at least in part on the configuration-based links, the other behavior-based links in the plurality of behavior-based links, and the new behavior-based link; and determine the probability of the new behavior-based link being created in the graph based at least in part on the plurality of link probabilities of the plurality of respective behavior-based links.

(A5) In the example system of any of A1-A4, wherein the processing system is further configured to: after the plurality of behavior-based links are added to the graph, add a new node to the plurality of nodes in real-time to represent a new resource as a result of discovery of the new resource; add at least one new configuration-based link to the graph, each new configuration-based link representing a hierarchical relationship between the new node and another respective node of the plurality of nodes; and add at least one new behavior-based link to the plurality of behavior-based links, each new behavior-based link being between the new node and another respective node of the plurality of nodes.

(A6) In the example system of any of A1-A5, wherein the processing system is configured to: determine that a motif in the graph is associated with malicious activity; determine that the motif includes the new behavior-based link; and identify the new behavior-based link as a potentially malicious link further based at least in part on the motif, which is associated with the malicious activity, including the new behavior-based link.

(A7) In the example system of any of A1-A6, wherein the processing system is configured to: provide an alert to an entity associated with the network-based system based at least in part on the new behavior-based link being identified as a potentially malicious link, the alert indicating that the new behavior-based link between the designated first node and the designated second node is potentially malicious.

(A8) In the example system of any of A1-A7, wherein the processing system is configured to: not allow creation of the new behavior-based link between the designated first node and the designated second node based at least in part on the new behavior-based link being identified as a potentially malicious link.

(A9) In the example system of any of A1-A8, wherein the processing system is configured to: determine that the new behavior-based link between the designated first node and the designated second node is created; and disconnect the new behavior-based link between the designated first node and the designated second node based at least in part on the new behavior-based link being identified as a potentially malicious link.

(A10) In the example system of any of A1-A9, wherein the processing system is configured to: compare the probability of the new behavior-based link being created in the graph to a second threshold probability that is less than the first threshold probability; and perform either a first action or a second action depending on whether the probability of the new behavior-based link being created in the graph is less than or equal to the second threshold probability, including: perform the first action as a result of the probability of the new behavior-based link being created in the graph being greater than the second threshold probability, the first action including providing an alert to an entity associated with the network-based system, the alert indicating that the new behavior-based link between the designated first node and the designated second node is potentially malicious; or perform the second action as a result of the probability of the new behavior-based link being created in the graph being less than or equal to the second threshold probability, the second action including not allowing creation of the new behavior-based link between the designated first node and the designated second node.

(A11) In the example system of any of A1-A10, wherein the processing system is configured to: determine a confidence in an accuracy of the probability of the new behavior-based link being created in the graph; compare the confidence to a confidence threshold; and perform the security action further based at least in part on the confidence being greater than or equal to the confidence threshold.

(A12) In the example system of any of A1-A11, wherein the processing system is configured to: determine a sensitivity of data associated with the designated second node; compare the sensitivity to a sensitivity threshold; and perform the security action further based at least in part on the sensitivity being greater than or equal to the sensitivity threshold.

(A13) In the example system of any of A1-A12, wherein the processing system is configured to: determine a number of the plurality of resources whose performance is to be reduced by creation of the new behavior-based link; and provide a notification to an entity associated with the network-based system based at least in part on the new behavior-based link being identified as a potentially malicious link, the notification indicating the number of the plurality of resources whose performance is to be reduced by the creation of the new behavior-based link.

(A14) In the example system of any of A1-A13, wherein the processing system is configured to: determine an extent to which performance of the plurality of resources is to be reduced by creation of the new behavior-based link; and provide a notification to an entity associated with the network-based system based at least in part on the new behavior-based link being identified as a potentially malicious link, the notification indicating the extent to which the performance of the plurality of resources is to be reduced by the creation of the new behavior-based link.

(B1) An example method of using graph enrichment to detect a potentially malicious access attempt, the method implemented by a computing system (FIG. 1, 102A-102M or 106A-106N; FIG. 6, 600; FIG. 7, 702; FIG. 8, 800) that is included in a network-based system (FIG. 1, 100), the method comprising generating (FIG. 4A, 402) a graph that includes at least a subset of a plurality of nodes and a plurality of configuration-based links. The plurality of nodes represents a plurality of respective resources (FIG. 1, 110) in the network-based system. Each configuration-based link represents a hierarchical relationship between a respective pair of the nodes such that a first node in the pair belongs to a second node in the pair. The method further comprises adding (FIG. 4A, 404) a plurality of behavior-based links to the graph based at least in part on traffic logs (FIG. 6, 652) associated with at least a subset of the resources. Each behavior-based link represents at least one of the following: an access-based relationship between a respective pair of the nodes, which is based at least in part on a first node in the pair accessing a second node in the pair; or an association-based relationship between a respective pair of nodes, which is based at least in part on a first node in the pair having a relationship with a third node and which is further based at least in part on the third node sharing a link with a second node in the pair. The method further comprises identifying (FIG. 4A, 406) an attempt to create a new behavior-based link between a designated first node of the plurality of nodes and a designated second node of the plurality of nodes, wherein the designated first node attempts to access the designated second node. The method further comprises determining (FIG. 4A, 408) a probability of the new behavior-based link being created in the graph, wherein the probability is based at least in part on the plurality of configuration-based links and the plurality of behavior-based links. The method further comprises identifying (FIG. 4B, 412) the new behavior-based link as a potentially malicious link based at least in part on the probability of the new behavior-based link being created in the graph being less than or equal to a threshold probability. The method further comprises performing (FIG. 4B, 420) a security action based at least in part on the new behavior-based link being identified as a potentially malicious link, the security action configured to increase security of the network-based system.

(B2) In the method of B1, wherein an identified behavior-based link of the plurality of behavior-based links represents an access-based relationship between an identified pair of nodes, which is based at least in part on a first node in the identified pair accessing a second node in the identified pair.

(B3) In the method of any of B1-B2, wherein an identified behavior-based link of the plurality of behavior-based links represents an association-based relationship between an identified pair of nodes, which is based at least in part on a first node in the identified pair having a relationship with a third node and which is further based at least in part on the third node sharing a link with a second node in the identified pair.

(B4) In the method of any of B1-B3, further comprising: determining a plurality of link probabilities of the plurality of respective behavior-based links being created in the graph, wherein each link probability is based at least in part on the configuration-based links, the other behavior-based links in the plurality of behavior-based links, and the new behavior-based link; wherein determining the probability of the new behavior-based link being created in the graph comprises: determining the probability of the new behavior-based link being created in the graph based at least in part on the plurality of link probabilities of the plurality of respective behavior-based links.

(B5) In the method of any of B1-B4, further comprising: after adding the plurality of behavior-based links to the graph, adding a new node to the plurality of nodes in real-time to represent a new resource as a result of discovery of the new resource; adding at least one new configuration-based link to the graph, each new configuration-based link representing a hierarchical relationship between the new node and another respective node of the plurality of nodes; and adding at least one new behavior-based link to the plurality of behavior-based links, each new behavior-based link being between the new node and another respective node of the plurality of nodes.

(B6) In the method of any of B1-B5, further comprising: determining that a motif in the graph is associated with malicious activity; and determining that the motif includes the new behavior-based link; wherein identifying the new behavior-based link as a potentially malicious link comprises: identifying the new behavior-based link as a potentially malicious link further based at least in part on the motif, which is associated with the malicious activity, including the new behavior-based link.

(B7) In the method of any of B1-B6, wherein performing the security action comprises: providing an alert to an entity associated with the network-based system based at least in part on the new behavior-based link being identified as a potentially malicious link, the alert indicating that the new behavior-based link between the designated first node and the designated second node is potentially malicious.

(B8) In the method of any of B1-B7, wherein performing the security action comprises: not allowing creation of the new behavior-based link between the designated first node and the designated second node based at least in part on the new behavior-based link being identified as a potentially malicious link.

(B9) In the method of any of B1-B8, wherein identifying the attempt to create the new behavior-based link comprises: determining that the new behavior-based link between the designated first node and the designated second node is created; and wherein performing the security action comprises: disconnecting the new behavior-based link between the designated first node and the designated second node based at least in part on the new behavior-based link being identified as a potentially malicious link.

(B10) In the method of any of B1-B9, further comprising: comparing the probability of the new behavior-based link being created in the graph to a second threshold probability that is less than the first threshold probability; wherein performing the security action comprises: performing either a first action or a second action depending on whether the probability of the new behavior-based link being created in the graph is less than or equal to the second threshold probability, including: performing the first action as a result of the probability of the new behavior-based link being created in the graph being greater than the second threshold probability, the first action including providing an alert to an entity associated with the network-based system, the alert indicating that the new behavior-based link between the designated first node and the designated second node is potentially malicious; or performing the second action as a result of the probability of the new behavior-based link being created in the graph being less than or equal to the second threshold probability, the second action including not allowing creation of the new behavior-based link between the designated first node and the designated second node.

(B11) In the method of any of B1-B10, further comprising: determining a confidence in an accuracy of the probability of the new behavior-based link being created in the graph; and comparing the confidence to a confidence threshold; wherein performing the security action comprises: performing the security action further based at least in part on the confidence being greater than or equal to the confidence threshold.

(B12) In the method of any of B1-B11, further comprising: determining a sensitivity of data associated with the designated second node; and comparing the sensitivity to a sensitivity threshold; wherein performing the security action comprises: performing the security action further based at least in part on the sensitivity being greater than or equal to the sensitivity threshold.

(B13) In the method of any of B1-B12, further comprising: determining a number of the plurality of resources whose performance is to be reduced by creation of the new behavior-based link; wherein performing the security action comprises: providing a notification to an entity associated with the network-based system based at least in part on the new behavior-based link being identified as a potentially malicious link, the notification indicating the number of the plurality of resources whose performance is to be reduced by the creation of the new behavior-based link.

(B14) In the method of any of B1-B13, further comprising: determining an extent to which performance of the plurality of resources is to be reduced by creation of the new behavior-based link; wherein performing the security action comprises: providing a notification to an entity associated with the network-based system based at least in part on the new behavior-based link being identified as a potentially malicious link, the notification indicating the extent to which the performance of the plurality of resources is to be reduced by the creation of the new behavior-based link.

(C1) An example computer program product (FIG. 7, 724; FIG. 8, 818, 822) comprising a computer-readable storage medium having instructions recorded thereon for enabling a processor-based system (FIG. 1, 102A-102M or 106A-106N; FIG. 6, 600; FIG. 7, 702; FIG. 8, 800) to perform operations, which are configured to use graph enrichment to detect a potentially malicious access attempt. The operations comprise generating (FIG. 4A, 402) a graph that includes at least a subset of a plurality of nodes and a plurality of configuration-based links. The plurality of nodes represents a plurality of respective resources (FIG. 1, 110) in a network-based system (FIG. 1, 100). Each configuration-based link represents a hierarchical relationship between a respective pair of the nodes such that a first node in the pair belongs to a second node in the pair. The operations further comprise adding (FIG. 4A, 404) a plurality of behavior-based links to the graph based at least in part on traffic logs (FIG. 6, 652) associated with at least a subset of the resources. Each behavior-based link represents at least one of the following: an access-based relationship between a respective pair of the nodes, which is based at least in part on a first node in the pair accessing a second node in the pair; or an association-based relationship between a respective pair of nodes, which is based at least in part on a first node in the pair having a relationship with a third node and which is further based at least in part on the third node sharing a link with a second node in the pair. The operations further comprise identifying (FIG. 4A, 406) an attempt to create a new behavior-based link between a designated first node of the plurality of nodes and a designated second node of the plurality of nodes, wherein the designated first node attempts to access the designated second node. The operations further comprise determining (FIG. 4A, 408) a probability of the new behavior-based link being created in the graph, wherein the probability is based at least in part on the plurality of configuration-based links and the plurality of behavior-based links. The operations further comprise identifying (FIG. 4B, 412) the new behavior-based link as a potentially malicious link based at least in part on the probability of the new behavior-based link being created in the graph being less than or equal to a threshold probability. The operations further comprise performing (FIG. 4B, 420) a security action based at least in part on the new behavior-based link being identified as a potentially malicious link, the security action configured to increase security of the network-based system.

IV. Example Computer System

FIG. 8 depicts an example computer 800 in which embodiments may be implemented. Any one or more of the user devices 102A-102M and/or any one or more of the servers 106A-106N shown in FIG. 1 and/or computing system 600 shown in FIG. 6 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of (e.g., at least a portion of) the graph enrichment-based security logic 108, the graph enrichment-based security logic 608, the graph logic 612, the attempt identification logic 614, the probability determination logic 616, the malicious link determination logic 618, the action logic 620, the sensitivity determination logic 622, the resource impact logic 624, the graph generation logic 626, the link addition logic 628, the link disconnection logic 630, the graph enrichment-based security logic 792, flowchart 400 (including any step of flowchart 400), and/or flowchart 500 (including any step of flowchart 500), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to use graph enrichment to detect a potentially malicious access attempt, the system comprising:
a memory; and
a processing system coupled to the memory, the processing system configured to:
generate a graph that includes at least a subset of a plurality of nodes and a plurality of configuration-based links, the plurality of nodes representing a plurality of respective resources in a network-based system, each configuration-based link representing a hierarchical relationship between a respective pair of the nodes such that a first node in the pair belongs to a second node in the pair;
add a plurality of behavior-based links to the graph based at least in part on traffic logs associated with at least a subset of the resources, each behavior-based link representing at least one of the following:
an access-based relationship between a respective pair of the nodes, which is based at least in part on a first node in the pair accessing a second node in the pair; or
an association-based relationship between a respective pair of nodes, which is based at least in part on a first node in the pair having a relationship with a third node and which is further based at least in part on the third node sharing a link with a second node in the pair;
identify an attempt to create a new behavior-based link between a designated first node of the plurality of nodes and a designated second node of the plurality of nodes, wherein the designated first node attempts to access the designated second node;
determine a probability of the new behavior-based link being created in the graph, wherein the probability is based at least in part on the plurality of configuration-based links and the plurality of behavior-based links;
identify the new behavior-based link as a potentially malicious link based at least in part on the probability of the new behavior-based link being created in the graph being less than or equal to a threshold probability; and
perform a security action based at least in part on the new behavior-based link being identified as a potentially malicious link, the security action configured to increase security of the network-based system.

2. The system of claim 1, wherein an identified behavior-based link of the plurality of behavior-based links represents an access-based relationship between an identified pair of nodes, which is based at least in part on a first node in the identified pair accessing a second node in the identified pair.

3. The system of claim 1, wherein an identified behavior-based link of the plurality of behavior-based links represents an association-based relationship between an identified pair of nodes, which is based at least in part on a first node in the identified pair having a relationship with a third node and which is further based at least in part on the third node sharing a link with a second node in the identified pair.

4. The system of claim 1, wherein the processing system is configured to:
determine a plurality of link probabilities of the plurality of respective behavior-based links being created in the graph, wherein each link probability is based at least in part on the configuration-based links, the other behavior-based links in the plurality of behavior-based links, and the new behavior-based link; and
determine the probability of the new behavior-based link being created in the graph based at least in part on the plurality of link probabilities of the plurality of respective behavior-based links.

5. The system of claim 1, wherein the processing system is further configured to:
after the plurality of behavior-based links are added to the graph, add a new node to the plurality of nodes in real-time to represent a new resource as a result of discovery of the new resource;
add at least one new configuration-based link to the graph, each new configuration-based link representing a hierarchical relationship between the new node and another respective node of the plurality of nodes; and
add at least one new behavior-based link to the plurality of behavior-based links, each new behavior-based link being between the new node and another respective node of the plurality of nodes.

6. The system of claim 1, wherein the processing system is configured to:
determine that a motif in the graph is associated with malicious activity;
determine that the motif includes the new behavior-based link; and
identify the new behavior-based link as a potentially malicious link further based at least in part on the motif, which is associated with the malicious activity, including the new behavior-based link.

7. The system of claim 1, wherein the processing system is configured to:
provide an alert to an entity associated with the network-based system based at least in part on the new behavior-based link being identified as a potentially malicious link, the alert indicating that the new behavior-based link between the designated first node and the designated second node is potentially malicious.

8. The system of claim 1, wherein the processing system is configured to:
not allow creation of the new behavior-based link between the designated first node and the designated second node based at least in part on the new behavior-based link being identified as a potentially malicious link.

9. The system of claim 1, wherein the processing system is configured to:
determine that the new behavior-based link between the designated first node and the designated second node is created; and
disconnect the new behavior-based link between the designated first node and the designated second node based at least in part on the new behavior-based link being identified as a potentially malicious link.

10. The system of claim 1, wherein the processing system is configured to:
compare the probability of the new behavior-based link being created in the graph to a second threshold probability that is less than the first threshold probability; and
perform either a first action or a second action depending on whether the probability of the new behavior-based link being created in the graph is less than or equal to the second threshold probability, including:
   perform the first action as a result of the probability of the new behavior-based link being created in the graph being greater than the second threshold probability, the first action including providing an alert to an entity associated with the network-based system, the alert indicating that the new behavior-based link between the designated first node and the designated second node is potentially malicious; or
   perform the second action as a result of the probability of the new behavior-based link being created in the graph being less than or equal to the second threshold probability, the second action including not allowing creation of the new behavior-based link between the designated first node and the designated second node.

11. The system of claim 1, wherein the processing system is configured to:
   determine a confidence in an accuracy of the probability of the new behavior-based link being created in the graph;
   compare the confidence to a confidence threshold; and
   perform the security action further based at least in part on the confidence being greater than or equal to the confidence threshold.

12. A method of using graph enrichment to detect a potentially malicious access attempt, the method implemented by a computing system that is included in a network-based system, the method comprising:
   generating a graph that includes at least a subset of a plurality of nodes and a plurality of configuration-based links, the plurality of nodes representing a plurality of respective resources in the network-based system, each configuration-based link representing a hierarchical relationship between a respective pair of the nodes such that a first node in the pair belongs to a second node in the pair;
   adding a plurality of behavior-based links to the graph based at least in part on traffic logs associated with at least a subset of the resources, each behavior-based link representing at least one of the following:
      an access-based relationship between a respective pair of the nodes, which is based at least in part on a first node in the pair accessing a second node in the pair; or
      an association-based relationship between a respective pair of nodes, which is based at least in part on a first node in the pair having a relationship with a third node and which is further based at least in part on the third node sharing a link with a second node in the pair;
   identifying an attempt to create a new behavior-based link between a designated first node of the plurality of nodes and a designated second node of the plurality of nodes, wherein the designated first node attempts to access the designated second node;
   determining a probability of the new behavior-based link being created in the graph, wherein the probability is based at least in part on the plurality of configuration-based links and the plurality of behavior-based links;
   identifying the new behavior-based link as a potentially malicious link based at least in part on the probability of the new behavior-based link being created in the graph being less than or equal to a threshold probability; and
   performing a security action based at least in part on the new behavior-based link being identified as a potentially malicious link, the security action configured to increase security of the network-based system.

13. The method of claim 12, further comprising:
   determining that a motif in the graph is associated with malicious activity; and
   determining that the motif includes the new behavior-based link;
   wherein identifying the new behavior-based link as a potentially malicious link comprises:
      identifying the new behavior-based link as a potentially malicious link further based at least in part on the motif, which is associated with the malicious activity, including the new behavior-based link.

14. The method of claim 12, wherein performing the security action comprises at least one of the following:
   providing an alert to an entity associated with the network-based system based at least in part on the new behavior-based link being identified as a potentially malicious link, the alert indicating that the new behavior-based link between the designated first node and the designated second node is potentially malicious; or
   not allowing creation of the new behavior-based link between the designated first node and the designated second node based at least in part on the new behavior-based link being identified as a potentially malicious link.

15. The method of claim 12, wherein identifying the attempt to create the new behavior-based link comprises:
   determining that the new behavior-based link between the designated first node and the designated second node is created; and
   wherein performing the security action comprises:
      disconnecting the new behavior-based link between the designated first node and the designated second node based at least in part on the new behavior-based link being identified as a potentially malicious link.

16. The method of claim 12, further comprising:
   comparing the probability of the new behavior-based link being created in the graph to a second threshold probability that is less than the first threshold probability;
   wherein performing the security action comprises:
      performing either a first action or a second action depending on whether the probability of the new behavior-based link being created in the graph is less than or equal to the second threshold probability, including:
         performing the first action as a result of the probability of the new behavior-based link being created in the graph being greater than the second threshold probability, the first action including providing an alert to an entity associated with the network-based system, the alert indicating that the new behavior-based link between the designated first node and the designated second node is potentially malicious; or
         performing the second action as a result of the probability of the new behavior-based link being created in the graph being less than or equal to the second threshold probability, the second action including not allowing creation of the new behavior-based link between the designated first node and the designated second node.

17. The method of claim 12, further comprising:
   determining a sensitivity of data associated with the designated second node; and comparing the sensitivity to a sensitivity threshold;
wherein performing the security action comprises:
  performing the security action further based at least in part on the sensitivity being greater than or equal to the sensitivity threshold.

18. The method of claim 12, further comprising:
determining a number of the plurality of resources whose performance is to be reduced by creation of the new behavior-based link;
wherein performing the security action comprises:
  providing a notification to an entity associated with the network-based system based at least in part on the new behavior-based link being identified as a potentially malicious link, the notification indicating the number of the plurality of resources whose performance is to be reduced by the creation of the new behavior-based link.

19. The method of claim 12, further comprising:
determining an extent to which performance of the plurality of resources is to be reduced by creation of the new behavior-based link;
wherein performing the security action comprises:
  providing a notification to an entity associated with the network-based system based at least in part on the new behavior-based link being identified as a potentially malicious link, the notification indicating the extent to which the performance of the plurality of resources is to be reduced by the creation of the new behavior-based link.

20. A computer program product comprising a computer-readable storage medium having instructions recorded thereon for enabling a processor-based system to perform operations, which are configured to use graph enrichment to detect a potentially malicious access attempt, the operations comprising:
  generating a graph that includes at least a subset of a plurality of nodes and a plurality of configuration-based links, the plurality of nodes representing a plurality of respective resources in a network-based system, each configuration-based link representing a hierarchical relationship between a respective pair of the nodes such that a first node in the pair belongs to a second node in the pair;
  adding a plurality of behavior-based links to the graph based at least in part on traffic logs associated with at least a subset of the resources, each behavior-based link representing at least one of the following:
    an access-based relationship between a respective pair of the nodes, which is based at least in part on a first node in the pair accessing a second node in the pair; or
    an association-based relationship between a respective pair of nodes, which is based at least in part on a first node in the pair having a relationship with a third node and which is further based at least in part on the third node sharing a link with a second node in the pair;
  identifying an attempt to create a new behavior-based link between a designated first node of the plurality of nodes and a designated second node of the plurality of nodes, wherein the designated first node attempts to access the designated second node;
  determining a probability of the new behavior-based link being created in the graph, wherein the probability is based at least in part on the plurality of configuration-based links and the plurality of behavior-based links;
  identifying the new behavior-based link as a potentially malicious link based at least in part on the probability of the new behavior-based link being created in the graph being less than or equal to a threshold probability; and
  performing a security action based at least in part on the new behavior-based link being identified as a potentially malicious link, the security action configured to increase security of the network-based system.

* * * * *